(12) United States Patent
Laroco, Jr. et al.

(10) Patent No.: US 8,751,498 B2
(45) Date of Patent: *Jun. 10, 2014

(54) FINDING AND DISAMBIGUATING REFERENCES TO ENTITIES ON WEB PAGES

(75) Inventors: Leonardo A. Laroco, Jr., Philadelphia, PA (US); Nikola Jevtic, Newark, NJ (US); Nikolai V. Yakovenko, New York, NY (US); Jeffrey Reynar, New York, NY (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/364,244

(22) Filed: Feb. 1, 2012

(65) Prior Publication Data

US 2012/0203777 A1 Aug. 9, 2012

Related U.S. Application Data

(63) Continuation of application No. 11/551,657, filed on Oct. 20, 2006, now Pat. No. 8,122,026.

(51) Int. Cl.
*G06F 17/30* (2006.01)

(52) U.S. Cl.
USPC .............. 707/737; 707/729; 707/730

(58) Field of Classification Search
None
See application file for complete search history.

(56) References Cited

U.S. PATENT DOCUMENTS

| | | |
|---|---|---|
| 5,010,478 A | 4/1991 | Deran |
| 5,133,075 A | 7/1992 | Risch |
| 5,347,653 A | 9/1994 | Flynn et al. |
| 5,440,730 A | 8/1995 | Elmasri et al. |
| 5,475,819 A | 12/1995 | Miller et al. |
| 5,519,608 A | 5/1996 | Kupiec |
| 5,546,507 A | 8/1996 | Staub |
| 5,560,005 A | 9/1996 | Hoover et al. |
| 5,574,898 A | 11/1996 | Leblang et al. |
| 5,675,785 A | 10/1997 | Hall et al. |
| 5,680,622 A | 10/1997 | Even |
| 5,694,590 A | 12/1997 | Thuraisingham et al. |
| 5,701,470 A | 12/1997 | Joy et al. |

(Continued)

FOREIGN PATENT DOCUMENTS

| | | |
|---|---|---|
| JP | 5-174020 A | 7/1993 |
| JP | 11-265400 A | 9/1999 |

(Continued)

OTHER PUBLICATIONS

Betz, Examiner's Answer, U.S. Appl. No. 11/097,688, Jul. 8, 2010, 18 pgs.

(Continued)

*Primary Examiner* — Syed Hasan
(74) *Attorney, Agent, or Firm* — Morgan, Lewis & Bockius LLP

(57) ABSTRACT

A system and method for disambiguating references to entities in a document. In one embodiment, an iterative process is used to disambiguate references to entities in documents. An initial model is used to identify documents referring to an entity based on features contained in those documents. The occurrence of various features in these documents is measured. From the number occurrences of features in these documents, a second model is constructed. The second model is used to identify documents referring to the entity based on features contained in the documents. The process can be repeated, iteratively identifying documents referring to the entity and improving subsequent models based on those identifications. Additional features of the entity can be extracted from documents identified as referring to the entity.

20 Claims, 9 Drawing Sheets

(56) References Cited

U.S. PATENT DOCUMENTS

| | | |
|---|---|---|
| 5,717,911 A | 2/1998 | Madrid et al. |
| 5,717,951 A | 2/1998 | Yabumoto |
| 5,724,571 A | 3/1998 | Woods |
| 5,778,373 A | 7/1998 | Levy et al. |
| 5,778,378 A | 7/1998 | Rubin |
| 5,787,413 A | 7/1998 | Kauffman et al. |
| 5,793,966 A | 8/1998 | Amstein et al. |
| 5,802,299 A | 9/1998 | Logan et al. |
| 5,815,415 A | 9/1998 | Bentley et al. |
| 5,819,210 A | 10/1998 | Maxwell, III et al. |
| 5,819,265 A | 10/1998 | Ravin et al. |
| 5,822,743 A | 10/1998 | Gupta et al. |
| 5,826,258 A | 10/1998 | Gupta et al. |
| 5,838,979 A | 11/1998 | Hart et al. |
| 5,882,743 A | 3/1999 | McConnell |
| 5,909,689 A | 6/1999 | Van Ryzin |
| 5,920,859 A | 7/1999 | Li |
| 5,943,670 A | 8/1999 | Prager |
| 5,956,718 A | 9/1999 | Prasad et al. |
| 5,963,940 A | 10/1999 | Liddy et al. |
| 5,974,254 A | 10/1999 | Hsu |
| 5,987,460 A | 11/1999 | Niwa et al. |
| 6,006,221 A | 12/1999 | Liddy et al. |
| 6,018,741 A | 1/2000 | Howland et al. |
| 6,038,560 A | 3/2000 | Wical |
| 6,044,366 A | 3/2000 | Graffe et al. |
| 6,052,693 A | 4/2000 | Smith et al. |
| 6,064,952 A | 5/2000 | Imanaka et al. |
| 6,073,130 A | 6/2000 | Jacobson et al. |
| 6,078,918 A | 6/2000 | Allen et al. |
| 6,112,203 A | 8/2000 | Bharat et al. |
| 6,112,210 A | 8/2000 | Nori et al. |
| 6,122,647 A | 9/2000 | Horowitz et al. |
| 6,134,555 A | 10/2000 | Chadha et al. |
| 6,138,270 A | 10/2000 | Hsu |
| 6,182,063 B1 | 1/2001 | Woods |
| 6,202,065 B1 | 3/2001 | Wills |
| 6,212,526 B1 | 4/2001 | Chaudhuri et al. |
| 6,240,546 B1 | 5/2001 | Lee et al. |
| 6,263,328 B1 | 7/2001 | Coden et al. |
| 6,263,358 B1 | 7/2001 | Lee et al. |
| 6,266,805 B1 | 7/2001 | Nwana et al. |
| 6,285,999 B1 | 9/2001 | Page |
| 6,289,338 B1 | 9/2001 | Stoffel et al. |
| 6,311,194 B1 | 10/2001 | Sheth et al. |
| 6,314,555 B1 | 11/2001 | Ndumu et al. |
| 6,327,574 B1 | 12/2001 | Kramer et al. |
| 6,349,275 B1 | 2/2002 | Schumacher et al. |
| 6,377,943 B1 | 4/2002 | Jakobsson |
| 6,397,228 B1 | 5/2002 | Lamburt et al. |
| 6,438,543 B1 | 8/2002 | Kazi et al. |
| 6,470,330 B1 | 10/2002 | Das et al. |
| 6,473,898 B1 | 10/2002 | Waugh et al. |
| 6,487,495 B1 | 11/2002 | Gale et al. |
| 6,502,102 B1 | 12/2002 | Haswell et al. |
| 6,519,631 B1 | 2/2003 | Rosenschein et al. |
| 6,556,991 B1 | 4/2003 | Borkovsky |
| 6,565,610 B1 | 5/2003 | Wang et al. |
| 6,567,846 B1 | 5/2003 | Garg et al. |
| 6,567,936 B1 | 5/2003 | Yang et al. |
| 6,572,661 B1 | 6/2003 | Stern |
| 6,578,032 B1 | 6/2003 | Chandrasekar et al. |
| 6,584,464 B1 | 6/2003 | Warthen |
| 6,584,646 B2 | 7/2003 | Fujita |
| 6,594,658 B2 | 7/2003 | Woods |
| 6,606,625 B1 | 8/2003 | Muslea et al. |
| 6,606,659 B1 | 8/2003 | Hegli et al. |
| 6,609,123 B1 | 8/2003 | Cazemier et al. |
| 6,636,742 B1 | 10/2003 | Torkki et al. |
| 6,643,641 B1 | 11/2003 | Snyder |
| 6,665,659 B1 | 12/2003 | Logan |
| 6,665,666 B1 | 12/2003 | Brown et al. |
| 6,665,837 B1 | 12/2003 | Dean et al. |
| 6,675,159 B1 | 1/2004 | Lin et al. |
| 6,684,205 B1 | 1/2004 | Modha et al. |
| 6,693,651 B2 | 2/2004 | Biebesheimer et al. |
| 6,704,726 B1 | 3/2004 | Amouroux |
| 6,738,767 B1 | 5/2004 | Chung et al. |
| 6,745,189 B2 | 6/2004 | Schreiber |
| 6,754,873 B1 | 6/2004 | Law et al. |
| 6,763,496 B1 | 7/2004 | Hennings et al. |
| 6,799,176 B1 | 9/2004 | Page |
| 6,804,667 B1 | 10/2004 | Martin |
| 6,820,081 B1 | 11/2004 | Kawai et al. |
| 6,820,093 B2 | 11/2004 | de la Huerga |
| 6,823,495 B1 | 11/2004 | Vedula et al. |
| 6,832,218 B1 | 12/2004 | Emens et al. |
| 6,845,354 B1 | 1/2005 | Kuo et al. |
| 6,850,896 B1 | 2/2005 | Kelman et al. |
| 6,868,411 B2 | 3/2005 | Shanahan |
| 6,873,982 B1 | 3/2005 | Bates et al. |
| 6,873,993 B2 | 3/2005 | Charlesworth et al. |
| 6,886,005 B2 | 4/2005 | Davis |
| 6,886,010 B2 | 4/2005 | Kostoff |
| 6,901,403 B1 | 5/2005 | Bata et al. |
| 6,904,429 B2 | 6/2005 | Sako et al. |
| 6,957,213 B1 | 10/2005 | Yuret |
| 6,963,880 B1 | 11/2005 | Pingte et al. |
| 6,965,900 B2 | 11/2005 | Srinivasa et al. |
| 7,003,506 B1 | 2/2006 | Fisk et al. |
| 7,003,522 B1 | 2/2006 | Reynar et al. |
| 7,003,719 B1 | 2/2006 | Rosenoff et al. |
| 7,007,228 B1 | 2/2006 | Carro |
| 7,013,308 B1 | 3/2006 | Tunstall-Pedoe |
| 7,020,662 B2 | 3/2006 | Boreham et al. |
| 7,043,521 B2 | 5/2006 | Eitel |
| 7,051,023 B2 | 5/2006 | Kapur et al. |
| 7,076,491 B2 | 7/2006 | Tsao |
| 7,080,073 B1 | 7/2006 | Jiang et al. |
| 7,080,085 B1 | 7/2006 | Choy et al. |
| 7,100,082 B2 | 8/2006 | Little et al. |
| 7,143,099 B2 | 11/2006 | Lecheler-Moore et al. |
| 7,146,536 B2 | 12/2006 | Bingham, Jr. et al. |
| 7,158,980 B2 | 1/2007 | Shen |
| 7,162,499 B2 | 1/2007 | Lees et al. |
| 7,165,024 B2 | 1/2007 | Glover et al. |
| 7,174,504 B2 | 2/2007 | Tsao |
| 7,181,471 B1 | 2/2007 | Ibuki et al. |
| 7,194,380 B2 | 3/2007 | Barrow et al. |
| 7,197,449 B2 | 3/2007 | Hu et al. |
| 7,216,073 B2 | 5/2007 | Lavi et al. |
| 7,233,943 B2 | 6/2007 | Modha et al. |
| 7,260,573 B1 | 8/2007 | Jeh et al. |
| 7,263,565 B2 | 8/2007 | Tawara et al. |
| 7,277,879 B2 | 10/2007 | Varadarajan |
| 7,302,646 B2 | 11/2007 | Nomiyama et al. |
| 7,305,380 B1 | 12/2007 | Hoelzle et al. |
| 7,325,160 B2 | 1/2008 | Tsao |
| 7,363,312 B2 | 4/2008 | Goldsack |
| 7,376,895 B2 | 5/2008 | Tsao |
| 7,398,461 B1 | 7/2008 | Broder et al. |
| 7,409,381 B1 | 8/2008 | Steel et al. |
| 7,412,078 B2 | 8/2008 | Kim |
| 7,418,736 B2 | 8/2008 | Ghanea-Hercock |
| 7,472,182 B1 | 12/2008 | Young et al. |
| 7,483,829 B2 | 1/2009 | Murakami et al. |
| 7,493,308 B1 | 2/2009 | Bair, Jr. et al. |
| 7,493,317 B2 | 2/2009 | Geva |
| 7,587,387 B2 | 9/2009 | Hogue |
| 7,644,076 B1 | 1/2010 | Ramesh et al. |
| 7,672,971 B2 | 3/2010 | Betz et al. |
| 7,685,201 B2 | 3/2010 | Zeng et al. |
| 7,698,303 B2 | 4/2010 | Goodwin et al. |
| 7,716,225 B1 | 5/2010 | Dean et al. |
| 7,747,571 B2 | 6/2010 | Boggs |
| 7,756,823 B2 | 7/2010 | Young et al. |
| 7,797,282 B1 | 9/2010 | Kirshenbaum et al. |
| 7,885,918 B2 | 2/2011 | Statchuk |
| 7,917,154 B2 | 3/2011 | Fortescue et al. |
| 7,953,720 B1 | 5/2011 | Rohde et al. |
| 8,024,281 B2 | 9/2011 | Proctor et al. |
| 8,065,290 B2 | 11/2011 | Hogue |
| 8,108,501 B2 | 1/2012 | Birnie et al. |
| 2001/0021935 A1 | 9/2001 | Mills |

(56) References Cited

U.S. PATENT DOCUMENTS

| | | |
|---|---|---|
| 2002/0022956 A1 | 2/2002 | Ukrainczyk et al. |
| 2002/0038307 A1 | 3/2002 | Obradovic et al. |
| 2002/0042707 A1 | 4/2002 | Zhao et al. |
| 2002/0065845 A1 | 5/2002 | Naito et al. |
| 2002/0073115 A1 | 6/2002 | Davis |
| 2002/0083039 A1 | 6/2002 | Ferrari et al. |
| 2002/0087567 A1 | 7/2002 | Spiegler et al. |
| 2002/0107861 A1 | 8/2002 | Clendinning et al. |
| 2002/0147738 A1 | 10/2002 | Reader |
| 2002/0169770 A1 | 11/2002 | Kim et al. |
| 2002/0174099 A1 | 11/2002 | Raj et al. |
| 2002/0178448 A1 | 11/2002 | Te Kiefte et al. |
| 2002/0194172 A1 | 12/2002 | Schreiber |
| 2003/0018652 A1 | 1/2003 | Heckerman et al. |
| 2003/0058706 A1 | 3/2003 | Okamoto et al. |
| 2003/0069880 A1 | 4/2003 | Harrison et al. |
| 2003/0078902 A1 | 4/2003 | Leong et al. |
| 2003/0088607 A1 | 5/2003 | Ruellan et al. |
| 2003/0097357 A1 | 5/2003 | Ferrari et al. |
| 2003/0120644 A1 | 6/2003 | Shirota |
| 2003/0120675 A1 | 6/2003 | Stauber et al. |
| 2003/0126102 A1 | 7/2003 | Borthwick |
| 2003/0126152 A1 | 7/2003 | Rajak |
| 2003/0149567 A1 | 8/2003 | Schmitz et al. |
| 2003/0149699 A1 | 8/2003 | Tsao |
| 2003/0154071 A1 | 8/2003 | Shreve |
| 2003/0167163 A1 | 9/2003 | Glover et al. |
| 2003/0177110 A1 | 9/2003 | Okamoto et al. |
| 2003/0182310 A1 | 9/2003 | Charnock et al. |
| 2003/0195872 A1 | 10/2003 | Senn |
| 2003/0195877 A1 | 10/2003 | Ford et al. |
| 2003/0196052 A1 | 10/2003 | Bolik et al. |
| 2003/0204481 A1 | 10/2003 | Lau |
| 2003/0208354 A1 | 11/2003 | Lin et al. |
| 2004/0003067 A1 | 1/2004 | Ferrin |
| 2004/0015481 A1 | 1/2004 | Zinda |
| 2004/0024739 A1 | 2/2004 | Copperman et al. |
| 2004/0049503 A1 | 3/2004 | Modha et al. |
| 2004/0059726 A1 | 3/2004 | Hunter et al. |
| 2004/0064447 A1 | 4/2004 | Simske et al. |
| 2004/0088292 A1 | 5/2004 | Dettinger et al. |
| 2004/0107125 A1 | 6/2004 | Guheen et al. |
| 2004/0122844 A1 | 6/2004 | Malloy et al. |
| 2004/0122846 A1 | 6/2004 | Chess et al. |
| 2004/0123240 A1 | 6/2004 | Gerstl et al. |
| 2004/0128624 A1 | 7/2004 | Arellano et al. |
| 2004/0143600 A1 | 7/2004 | Musgrove et al. |
| 2004/0153456 A1 | 8/2004 | Charnock et al. |
| 2004/0167870 A1 | 8/2004 | Wakefield et al. |
| 2004/0167907 A1 | 8/2004 | Wakefield et al. |
| 2004/0167911 A1 | 8/2004 | Wakefield et al. |
| 2004/0177015 A1 | 9/2004 | Galai et al. |
| 2004/0177080 A1 | 9/2004 | Doise et al. |
| 2004/0199923 A1 | 10/2004 | Russek |
| 2004/0243552 A1 | 12/2004 | Titemore et al. |
| 2004/0243614 A1 | 12/2004 | Boone et al. |
| 2004/0255237 A1 | 12/2004 | Tong |
| 2004/0260979 A1 | 12/2004 | Kumai |
| 2004/0267700 A1 | 12/2004 | Dumais et al. |
| 2004/0268237 A1 | 12/2004 | Jones et al. |
| 2005/0055365 A1 | 3/2005 | Ramakrishnan et al. |
| 2005/0076012 A1 | 4/2005 | Manber et al. |
| 2005/0080613 A1 | 4/2005 | Colledge et al. |
| 2005/0086211 A1 | 4/2005 | Mayer |
| 2005/0086222 A1 | 4/2005 | Wang et al. |
| 2005/0086251 A1 | 4/2005 | Hatscher et al. |
| 2005/0097150 A1 | 5/2005 | McKeon et al. |
| 2005/0108630 A1 | 5/2005 | Wasson et al. |
| 2005/0125311 A1 | 6/2005 | Chidiac et al. |
| 2005/0149576 A1 | 7/2005 | Marmaros et al. |
| 2005/0149851 A1 | 7/2005 | Mittal |
| 2005/0159851 A1 | 7/2005 | Engstrom et al. |
| 2005/0187923 A1 | 8/2005 | Cipollone |
| 2005/0188217 A1 | 8/2005 | Ghanea-Hercock |
| 2005/0240615 A1 | 10/2005 | Barsness et al. |
| 2005/0256825 A1 | 11/2005 | Dettinger et al. |
| 2006/0036504 A1 | 2/2006 | Allocca et al. |
| 2006/0041597 A1 | 2/2006 | Conrad et al. |
| 2006/0047691 A1 | 3/2006 | Humphreys et al. |
| 2006/0047838 A1 | 3/2006 | Chauhan |
| 2006/0053171 A1 | 3/2006 | Eldridge et al. |
| 2006/0053175 A1 | 3/2006 | Gardner et al. |
| 2006/0064411 A1 | 3/2006 | Gross et al. |
| 2006/0074824 A1 | 4/2006 | Li |
| 2006/0074910 A1 | 4/2006 | Yun et al. |
| 2006/0085465 A1 | 4/2006 | Nori et al. |
| 2006/0112110 A1 | 5/2006 | Maymir-Ducharme et al. |
| 2006/0123046 A1 | 6/2006 | Doise et al. |
| 2006/0129843 A1 | 6/2006 | Srinivasa et al. |
| 2006/0136585 A1 | 6/2006 | Mayfield et al. |
| 2006/0143227 A1 | 6/2006 | Helm et al. |
| 2006/0143603 A1 | 6/2006 | Kalthoff et al. |
| 2006/0152755 A1 | 7/2006 | Curtis et al. |
| 2006/0167991 A1 | 7/2006 | Heikes et al. |
| 2006/0224582 A1 | 10/2006 | Hogue |
| 2006/0238919 A1 | 10/2006 | Bradley |
| 2006/0242180 A1 | 10/2006 | Graf et al. |
| 2006/0248045 A1 | 11/2006 | Toledano et al. |
| 2006/0248456 A1 | 11/2006 | Bender et al. |
| 2006/0253418 A1 | 11/2006 | Charnock et al. |
| 2006/0259462 A1 | 11/2006 | Timmons |
| 2006/0277169 A1 | 12/2006 | Lunt et al. |
| 2006/0288268 A1 | 12/2006 | Srinivasan et al. |
| 2006/0293879 A1 | 12/2006 | Zhao et al. |
| 2007/0005593 A1 | 1/2007 | Self et al. |
| 2007/0005639 A1 | 1/2007 | Gaussier et al. |
| 2007/0016890 A1 | 1/2007 | Brunner et al. |
| 2007/0038610 A1 | 2/2007 | Omoigui |
| 2007/0043708 A1 | 2/2007 | Tunstall-Pedoe |
| 2007/0055656 A1 | 3/2007 | Tunstall-Pedoe |
| 2007/0073768 A1 | 3/2007 | Goradia |
| 2007/0094246 A1 | 4/2007 | Dill et al. |
| 2007/0100814 A1 | 5/2007 | Lee et al. |
| 2007/0130123 A1 | 6/2007 | Majumder |
| 2007/0143282 A1 | 6/2007 | Betz et al. |
| 2007/0143317 A1 | 6/2007 | Hogue et al. |
| 2007/0150800 A1 | 6/2007 | Betz et al. |
| 2007/0198451 A1 | 8/2007 | Kehlenbeck et al. |
| 2007/0198480 A1 | 8/2007 | Hogue et al. |
| 2007/0198481 A1 | 8/2007 | Hogue et al. |
| 2007/0198503 A1 | 8/2007 | Hogue et al. |
| 2007/0198577 A1 | 8/2007 | Betz et al. |
| 2007/0198598 A1 | 8/2007 | Betz et al. |
| 2007/0198600 A1 | 8/2007 | Betz |
| 2007/0203867 A1 | 8/2007 | Hogue et al. |
| 2007/0208773 A1 | 9/2007 | Tsao |
| 2007/0271268 A1 | 11/2007 | Fontoura et al. |
| 2008/0071739 A1 | 3/2008 | Kumar et al. |
| 2008/0104019 A1 | 5/2008 | Nath |
| 2009/0006359 A1 | 1/2009 | Liao |
| 2009/0119255 A1 | 5/2009 | Frank et al. |

FOREIGN PATENT DOCUMENTS

| | | | |
|---|---|---|---|
| JP | 2002-157276 A | | 5/2002 |
| JP | 2002-540506 A | | 11/2002 |
| JP | 2003-281173 A | | 10/2003 |
| WO | WO 01/27713 A2 | | 4/2001 |
| WO | WO 2004/114163 A2 | | 12/2004 |
| WO | WO 2006/104951 A1 | | 10/2006 |

OTHER PUBLICATIONS

Betz, Examiner's Answer, U.S. Appl. No. 11/394,414, Jan. 24, 2011, 31 pgs.

Betz, Notice of Allowance, U.S. Appl. No. 11/142,740, Apr. 16, 2009, 7 pgs.

Betz, Notice of Allowance, U.S. Appl. No. 11/142,765, Jul. 1, 2010, 14 pgs.

Betz, Notice of Allowance, U.S. Appl. No. 11/341,069, Sep. 8, 2008, 6 pgs.

Betz, Notice of Allowance, U.S. Appl. No. 12/939,981, Aug. 11, 2011, 7 pgs.

(56) References Cited

OTHER PUBLICATIONS

Betz, Notice of Allowance, U.S. Appl. No. 12/939,981, Apr. 26, 2011, 11 pgs.
Betz, Office Action, U.S. Appl. No. 11/142,740, Aug. 13, 2007, 12 pgs.
Betz, Office Action, U.S. Appl. No. 11/142,740, May 17, 2007, 12 pgs.
Betz, Office Action, U.S. Appl. No. 11/142,740, Jul. 23, 2008, 11 pgs.
Betz, Office Action, U.S. Appl. No. 11/142,740, Dec. 26, 2007, 12 pgs.
Betz, Office Action, U.S. Appl. No. 11/142,740, Jan. 27, 2009, 11 pgs.
Betz, Office Action, U.S. Appl. No. 11/142,740, Apr. 30, 2008, 14 pgs.
Betz, Office Action, U.S. Appl. No. 11/097,688, Mar. 18, 2009, 13 pgs.
Betz, Office Action, U.S. Appl. No. 11/097,688, Oct. 29, 2009, 11 pgs.
Betz, Office Action, U.S. Appl. No. 11/142,765, Jan. 8, 2010, 17 pgs.
Betz, Office Action, U.S. Appl. No. 11/142,765, May 9, 2008, 20 pgs.
Betz, Office Action, U.S. Appl. No. 11/142,765, Jan. 17, 2008, 16 pgs.
Betz, Office Action, U.S. Appl. No. 11/142,765, Oct. 17, 2007, 14 pgs.
Betz, Office Action, U.S. Appl. No. 11/142,765, Oct. 17, 2008, 17 pgs.
Betz, Office Action, U.S. Appl. No. 11/142,765, Jun. 18, 2007, 13 pgs.
Betz, Office Action, U.S. Appl. No. 11/142,765, Apr. 28, 2009, 16 pgs.
Betz, Office Action, U.S. Appl. No. 11/341,069, Apr. 1, 2008, 8 pgs.
Betz, Office Action, U.S. Appl. No. 11/394,414, Mar. 5, 2010, 24 pgs.
Betz, Office Action, U.S. Appl. No. 11/394,414, Sep. 15, 2009, 16 pgs.
Betz, Office Action, U.S. Appl. No. 11/394,552, Apr. 1, 2008, 14 pgs.
Betz, Office Action, U.S. Appl. No. 11/394,552, Aug. 4, 2010, 19 pgs.
Betz, Office Action, U.S. Appl. No. 11/394,552, Feb. 8, 2011, 22 pgs.
Betz, Office Action, U.S. Appl. No. 11/394,552, Jul. 8, 2011, 13 pgs.
Betz, Office Action, U.S. Appl. No. 11/394,552, Apr. 11, 2012, 15 pgs.
Betz, Office Action, U.S. Appl. No. 11/394,552, Nov. 12, 2008, 11 pgs.
Betz, Office Action, U.S. Appl. No. 11/394,552, Jan. 13, 2010, 15 pgs.
Betz, Office Action, U.S. Appl. No. 11/394,552, Mar. 13, 2009, 12 pgs.
Betz, Office Action, U.S. Appl. No. 11/394,552, Sep. 24, 2012, 21 pgs.
Betz, Office Action, U.S. Appl. No. 12/939,981, Dec. 9, 2010, 12 pgs.
Hogue, Examiner's Answer, U.S. Appl. No. 11/142,748, Oct. 3, 2011, 23 pgs.
Hogue, Notice of Allowance, U.S. Appl. No. 11/097,689, Apr. 30, 2009, 8 pgs.
Hogue, Notice of Allowance, U.S. Appl. No. 11/356,837, Jan. 6, 2012, 12 pgs.
Hogue, Notice of Allowance, U.S. Appl. No. 11/356,837, Apr. 27, 2012, 7 pgs.
Hogue, Notice of Allowance, U.S. Appl. No. 12/546,578, Jan. 6, 2011, 8 pgs.
Hogue, Notice of Allowance, U.S. Appl. No. 12/546,578, Jul. 12, 2011, 10 pgs.
Hogue, Notice of Allowance, U.S. Appl. No. 13/206,457, Mar. 14, 2012, 9 pgs.
Hogue, Office Action, U.S. Appl. No. 11/097,689, Oct. 3, 2008, 13 pgs.
Hogue, Office Action, U.S. Appl. No. 11/097,689, Apr. 9, 2008, 11 pgs.
Hogue, Office Action, U.S. Appl. No. 11/097,689, Jun. 21, 2007, 9 pgs.
Hogue, Office Action, U.S. Appl. No. 11/097,689, Nov. 27, 2007, 10 pgs.
Hogue, Office Action, U.S. Appl. No. 11/142,748, Dec. 7, 2007, 13 pgs.
Hogue, Office Action, U.S. Appl. No. 11/142,748, Jul. 13, 2010, 12 pgs.
Hogue, Office Action, U.S. Appl. No. 11/142,748, Aug. 17, 2009, 14 pgs.
Hogue, Office Action, U.S. Appl. No. 11/142,748, Nov. 17, 2010, 14 pgs.
Hogue, Office Action, U.S. Appl. No. 11/142,748, May 18, 2007, 9 pgs.
Hogue, Office Action, U.S. Appl. No. 11/142,748, Jul. 22, 2008, 18 pgs.
Hogue, Office Action, U.S. Appl. No. 11/142,748, Aug. 23, 2007, 13 pgs.
Hogue, Office Action, U.S. Appl. No. 11/142,748, Jan. 27, 2009, 17 pgs.
Hogue, Office Action, U.S. Appl. No. 11/356,837, Jun. 3, 2011, 18 pgs.
Hogue, Office Action, U.S. Appl. No. 11/356,837, Aug. 4, 2010, 20 pgs.
Hogue, Office Action, U.S. Appl. No. 11/356,837, Feb. 8, 2011, 14 pgs.
Hogue, Office Action, U.S. Appl. No. 11/356,837, May 11, 2009, 18 pgs.
Hogue, Office Action, U.S. Appl. No. 11/356,837, Feb. 19, 2010, 20 pgs.
Hogue, Office Action, U.S. Appl. No. 11/356,837, Mar. 21, 2008, 15 pgs.
Hogue, Office Action, U.S. Appl. No. 11/356,837, Oct. 27, 2009, 20 pgs.
Hogue, Office Action, U.S. Appl. No. 11/356,837, Sep. 30, 2008, 20 pgs.
Hogue, Office Action, U.S. Appl. No. 11/399,857, Mar. 1, 2012, 25 pgs.
Hogue, Office Action, U.S. Appl. No. 11/399,857, Mar. 3, 2011, 15 pgs.
Hogue, Office Action, U.S. Appl. No. 11/399,857, Jan. 5, 2009, 21 pgs.
Hogue, Office Action, U.S. Appl. No. 11/399,857, Jun. 8, 2009, 14 pgs.
Hogue, Office Action, U.S. Appl. No. 11/399,857, Sep. 13, 2010, 13 pgs.
Hogue, Office Action, U.S. Appl. No. 11/399,857, Jun. 24, 2011, 14 pgs.
Hogue, Office Action, U.S. Appl. No. 11/399,857, Dec. 28, 2009, 11 pgs.
Hogue, Office Action, U.S. Appl. No. 11/399,857, Mar. 31, 2008, 23 pgs.
Hogue, Office Action, U.S. Appl. No. 12/546,578, Aug. 4, 2010, 10 pgs.
Hogue, Office Action, U.S. Appl. No. 13/206,457, Oct. 28, 2011, 6 pgs.
Hogue, Office Action, U.S. Appl. No. 13/549,361, Oct. 4, 2012, 18 pgs.
Laroco, Notice of Allowance, U.S. Appl. No. 11/551,657, May 13, 2011, 8 pgs.
Laroco, Notice of Allowance, U.S. Appl. No. 11/551,657, Sep. 28, 2011, 8 pgs.
Laroco, Office Action, U.S. Appl. No. 11/551,657, Aug. 1, 2008, 15 pgs.
Laroco, Office Action, U.S. Appl. No. 11/551,657, Aug. 13, 2009, 16 pgs.
Laroco, Office Action, U.S. Appl. No. 11/551,657, Nov. 17, 2010, 20 pgs.
Laroco, Office Action, U.S. Appl. No. 11/551,657, Feb. 24, 2010, 17 pgs.
Laroco, Office Action, U.S. Appl. No. 11/551,657, Jan. 28, 2009, 17 pgs.
Rohde, Notice of Allowance, U.S. Appl. No. 11/097,690, Dec. 23, 2010, 8 pgs.

(56) References Cited

OTHER PUBLICATIONS

Rohde, Office Action, U.S. Appl. No. 11/097,690, May 1, 2008, 21 pgs.
Rohde, Office Action, U.S. Appl. No. 11/097,690, Jun. 9, 2010, 11 pgs.
Rohde, Office Action, U.S. Appl. No. 11/097,690, Oct. 15, 2008, 22 pgs.
Rohde, Office Action, U.S. Appl. No. 11/097,690, Aug. 27, 2009, 13 pgs.
Rohde, Office Action, U.S. Appl. No. 11/097,690, Apr. 28, 2009, 9 pgs.
Rohde, Office Action, U.S. Appl. No. 11/097,690, Sep. 28, 2007, 17 pgs.
Shamsi, Notice of Allowance, U.S. Appl. No. 11/781,891, Oct. 25, 2010, 7 pgs.
Shamsi, Notice of Allowance, U.S. Appl. No. 11/781,891, May 27, 2010, 6 pgs.
Shamsi, Office Action, U.S. Appl. No. 11/781,891, Nov. 16, 2009, 10 pgs.
Vespe, Notice of Allowance, U.S. Appl. No. 11/686,217, Aug. 27, 2012, 11 pgs.
Vespe, Notice of Allowance, U.S. Appl. No. 11/745,605, Jun. 13, 2011, 9 pgs.
Vespe, Notice of Allowance, U.S. Appl. No. 11/745,605, Sep. 22, 2011, 9 pgs.
Vespe, Notice of Allowance, U.S. Appl. No. 11/745,605, Mar. 28, 2012, 10 pgs.
Vespe, Office Action, U.S. Appl. No. 11/686,217, Sep. 10, 2010, 14 pgs.
Vespe, Office Action, U.S. Appl. No. 11/686,217, Jan. 26, 2012, 12 pgs.
Vespe, Office Action, U.S. Appl. No. 11/686,217, Mar. 26, 2010, 13 pgs.
Vespe, Office Action, U.S. Appl. No. 11/745,605, Apr. 8, 2010, 15 pgs.
Vespe, Office Action, U.S. Appl. No. 11/745,605, Jul. 30, 2009, 17 pgs.
Zhao, Notice of Allowance, U.S. Appl. No. 11/394,610, May 11, 2009, 15 pgs.
Zhao, Office Action, U.S. Appl. No. 11/142,853, Oct. 2, 2009, 10 pgs.
Zhao, Office Action, U.S. Appl. No. 11/142,853, Sep. 5, 2008, 9 pgs.
Zhao, Office Action, U.S. Appl. No. 11/142,853, Mar. 17, 2009, 9 pgs.
Zhao, Office Action, U.S. Appl. No. 11/142,853, Jan. 25, 2008, 7 pgs.
Zhao, Office Action, U.S. Appl. No. 11/394,610, Apr. 1, 2008, 18 pgs.
Zhao, Office Action, U.S. Appl. No. 11/394,610, Nov. 13, 2008, 18 pgs.
Zhao, Office Action, U.S. Appl. No. 11/941,382, Sep. 8, 2011, 28 pgs.
Zhao, Office Action, U.S. Appl. No. 11/941,382, Aug. 12, 2010, 23 pgs.
Zhao, Office Action, U.S. Appl. No. 11/941,382, May 24, 2012, 26 pgs.
Zhao, Office Action, U.S. Appl. No. 11/941,382, Nov. 26, 2012, 24 pgs.
Zhao, Office Action, U.S. Appl. No. 11/941,382, Jan. 27, 2011, 24 pgs.
Zhao, Office Action, U.S. Appl. No. 11/941,382, Dec. 29, 2009, 25 pgs.
Agichtein, Snowball Extracting Relations from Large Plain-Text Collections, Columbia Univ. Computer Science Dept. Technical Report CUCS-033-99, Dec. 1999, pp. 1-13.
Andritsos, Information-Theoretic Tools for Mining Database Structure from Large Data Sets, ACM SIGMOD, Jun. 13-18, 2004, 12 pgs.
Anonymous, Information Entropy, Wikipedia, May 3, 2006, 9 pgs.
Brill, An Analysis of the AskMSR Question-Answering System, Proc. of the Conference of Empirical Methods in Natural Language Processing (EMNLP), Jul. 2002, pp. 257-264.
Brin, Extracting Patterns and Relations from the World Wide Web, Computer Science Department, Stanford University, 1999, 12 pgs.
Brin, The Anatomy of a Large-Scale Hypertextual Web Search Engine, 7th Int'l World Wide Web Conference, Brisbane, Australia, Apr. 14-18, 1998, pp. 1-26.
Bunescu, Using Encyclopedia Knowledge for Named Entity Disambiguation, Department of Computer Sciences, University of Texas, retrieved from internet Dec. 28, 2006, 8 pgs.
Chang, Iepad: Information Extraction Based on Pattern Discovery, WWW 10 '01, ACM, Hong Kong, May 1-5, 2001, pp. 681-688.
Chen, A Scheme for Inference Problems Using Rough Sets and Entropy, Lecture Notes in Computer Science, vol. 3642/2005, Regina, Canada, Aug. 31-Sep. 3, 2005, pp. 558-567.
Chu-Carroll, A Multi-Strategy with Multi-Source Approach to Question Answering, IBM T.J. Watson Research Center, Yorktown Heights, NY, 2006, 8 pgs.
Cover, Entropy, Relative Entropy and Mutual Information, Chapter 2, Elements of Information Theory, Wiley-InterScience, New York, NY, 1991, pp. 12-23.
Craswell, Effective Site Finding using Link Anchor Information, SIGIR '01, Sep. 9-12, 2001, pp. 250-257.
Dean, MapReduce: Simplified Data Processing on Large Clusters, OSDI, 2004, pp. 1-13.
Dean, Using Design Recovery Techniques to Transform Legacy Systems, Software Maintenance, Proceedings, IEEE International Conference, Nov. 7-9, 2001, 10 pgs.
Dong, Reference Reconciliation in Complex Information Spaces, SIGACM-SIGMOD, 2005, 12 pgs.
Downey, Learning Text Patterns for Web Information Extraction and Assessment, American Association for Artificial Intelligence, 2002, 6 pgs.
Etzioni, Unsupervised Named-Entity Extraction from the Web: An Experimental Study, Dept. of Computer Science and Engineering, Univ. of Washington, Seattle, WA, Feb. 28, 2005, 42 pgs.
Etzioni, Web-scale Information Extraction in KnowItAll (Preliminary Results), WWW2004, New York, NY, May 17-22, 2004, 11 pgs.
Freitag, Boosted Wrapper Induction, American Association for Artificial Intelligence, 2000, 7 pgs.
Gao, Learning Information Extraction Patterns from Tabular Web Pages Without Manual Labelling, Proc. of IEEE/WIC Int'l Conf. on Web Intelligence (WI'03), Oct. 13-17, 2003, pp. 495-498.
Gigablast, Web/Directory, http://www.gigablast.com/?c=dmoz3, printed Aug. 24, 2010, 1 pg.
Gilster, Get Fast Answers, Easily, The News Observer, May 14, 2003, 2 pgs.
Google Inc., International Search Report and Written Opinion, PCT/US2006/007639, Sep. 13, 2006, 5 pgs.
Google Inc., International Search Report and Written Opinion, PCT/US2006/010965, Jul. 5, 2006, 4 pgs.
Google Inc., International Search Report and Written Opinion, PCT/US2006/019807, Dec. 18, 2006, 4 pgs.
Google Inc., International Search Report and Written Opinion, PCT/US2007/061156, Feb. 11, 2008, 5 pgs.
Google Inc., Office Action, Canadian Patent Application 2,610,208, Sep. 21, 2011, 3 pgs.
Google Inc., Office Action, European Patent Application 06784449.8, Mar. 26, 2012, 7 pgs.
Google Inc., Office Action, Japanese Patent Application 2008-504204, Oct. 12, 2011, 2 pgs.
Gray, Entropy and Information Theory, Springer-Verlag, New York, NY, 1990, pp. 17-46.
Guha, Disambiguating People in Search, WWW2004, New York, NY, May 17-22, 2004, 9 pgs.
Guha, Object Co-Identification on the Semantic Web, WWW2004, New York, NY, May 17-22, 2004, 9 pgs.
Haveliwala, Topic-Sensitive PageRank, Proceeding of the 11th Int'l World Wide Web Conference, Honolulu, Hawaii, May 7-11, 2002, pp. 1-23.
Hogue, Tree Pattern Inference and Matching for Wrapper Induction on the World Wide Web, Master of Engineering in Electrical Engineering and Computer Science, Massachusetts Institute of Technology, Jun. 2004, pp. 1-106.
Hsu, Finite-State Transducers for Semi-Structured Text Mining, IJCAI-99 Workshop on Text Mining, 1999.

(56) References Cited

OTHER PUBLICATIONS

Ilyas, Rank-Aware Query Optimization, ACM SIGMOD 2004, Paris, France, Jun. 13-18, 2004, 12 pgs.
Jeh, Scaling Personalized Web Search, Proceedings of the 12th Int'l World Wide Web Conference, Budapest, Hungary, May 20-24, 2003, pp. 1-24.
Ji, Re-Ranking Algorithms for Name Tagging, Workshop on Computationally Hard Problems and Joint Inference in Speech and Language Processing, Jun. 2006, 8 pgs.
Jones, Bootstrapping for Text Learning Tasks, Carnegie Mellon University, Pittsburgh, PA, 1999, 12 pgs.
Koeller, Approximate Matching of Textual Domain Attributes for Information Source Integration, IQIS '05 Proceedings of the 2nd International Workshop on Information Source Integration, Jun. 17, 2005, 10 pgs.
Kolodner, Indexing and Retrieval Strategies for Natural Language Fact Retrieval, ACM Trans. Database Syst. 8.3., Sep. 1983, 434-464.
Kosala, Web Mining Research: A Survey, SIGKDD Explorations, vol. 2, Iss. 1, Jul. 2000, 14 pages.
Kosseim, Answer Formulation for Question-Answering, Concordia University, Montreal, Quebec, Canada, Oct. 1, 2007, 11 pages.
Lin, Question Answering from the Web Using Knowledge Annotation and Knowledge Mining Techniques, CIKM'03, New Orleans, LA, Nov. 3-8, 2003, pp. 116-123.
Liu, Mining Data Records in Web Pages, Conference '00, ACM 2000, pp. 1-10.
MacKay, Information Theory, Inference and Learning Algorithms, Cambridge University Press, 2003, pp. 22-33, 138-140.
Mann, Unsupervised Personal Name Disambiguation, Proceedings of the 7th Conference on Natural Language Learning at HLT-NAACL, 2003, 8 pages.
McAccallum, Object Consolidation by Graph Partitioning with a Conditionally-Trained Distance Metric, SIGKDD 03, Washington, DC, Aug. 24-27, 2003, 6 pgs.
Merriam Webster Dictionary defines "normalize" as "to make conform to or reduce to a norm or standard", date: 1865, 2 pgs, Date: 2010.
Merriam Webster Dictionary defines "value" as "a numerical quantity that is assigned or is determined by calculation or measurement", date: 1300, 2 pgs, Date: 2010.
Microsoft Computer Dictionary defines "normalize" as "adjust number within specific range", May 2, 2002, 4 pgs.
Microsoft Computer Dictionary Defines "quantity" as a "number", May 1, 2002, 4 pgs.
Microsoft Computer Dictionary defines "value" as "a quantity", May 1, 2002, 4 pgs.
Mihalcea, PageRank on Semantic Networks, with Application to Word Sense Disambiguation, Proceedings of the 20th International Conference on Computational Linguistics, Aug. 23-27, 2004, 7 pgs.
Mihalcea, TextRank: Bringing Order into Texts, Proceedings of the Conference on Empirical Methods in Natural Language Processing, Jul. 2004, 8 pages.
Nadeau, Unsupervised named-Entity Recognition: Generating Gazetteers and Resolving Ambiguity, Inst. for Information Technology, National Research Council Canada, Gatineau and Ottawa, Canada, Aug. 1, 2006, 12 pgs.
Nyberg, The Javelin Question-Answering System at TREC2003: A Multi Strategy Approach With Dynamic Planning, TREC2003, Nov. 18-21, 2003, 9 pages.
Ogden, Improving Cross-Language Text Retrieval with Human Interactions, Proc. of the $33^{rd}$ Hawaii Int'l Conf. on Systems Science, IEEE, 2000, 9 pgs.
Page, The PageRank Citation Ranking: Bringing Order to the Web, Stanford Digital Libraries Working Paper, 1998, pp. 1-17.
Pawson, Sorting and Grouping, Feb. 7, 2004, pp. 1-19.
Plaisant, Interface and Data Architecture for Query Preview in Networked Information Systems, ACM Transaction on Information Systems, vol. 17, Iss. 3, Jul. 1999, 18 pgs.
Prager, IBM's Piquant in TREC2003, Nov. 18-21, 2003, 10 pgs.
Prager, Question Answering Using Constraint Satisfaction: QA—by Dossier with Constraints, 2004, 8 pgs.
Ramakrishnan, Is Question Answering an Acquired Skill?, WWW2004, New York, NY, May 17-22, 2004, pp. 111-120.
Richardson, Beyond Page Rank: Machine Learning for Static Ranking, International World Wide Web Conference Committee, May 23, 2006, 9 pgs.
Richardson, The Intelligent Surfer: Probabilistic Combination of Link and Content Information in PageRank, Advances in Neural Information Processing Systems, vol. 14, MIT Press, Cambridge, MA, 2002, 8 pgs.
Riloff, Learning Dictionaries for Information Extraction by Multi-Level Bootstrapping, American Association for Artificial Intelligence, 1999, 6 pgs.
Shannon, A Mathematical Theory of Communication, The Bell System Technical Journal, vol. 27, Jul., Oct. 1948, pp. 1-55.
Sun Microsystems, Attribute Names, Feb. 17, 2004, pp. 1-2.
Wang, C4-2: Combining Link and Contents in Clustering Web Search to Improve Information Interpretation, The University of Tokyo, 2002, pp. 1-9.
Wirzenius, C Preprocessor Trick for Implementing Similar Data Types, Jan. 17, 2000, 9 pgs.
Zhao, Corroborate and Learn Facts from the Web, KDD '07, Aug. 12-15, 2007, 9 pgs.
Betz, Final Office Action, U.S. Appl. No. 11/394,552, Oct. 21, 2013, 22 pgs.
Betz, Notice of Allowance, U.S. Appl. No. 13/302,755, Aug. 28, 2013, 6 pgs.
Betz, Office Action, U.S. Appl. No. 11/394,552, Apr. 23, 2013, 21 pgs.
Betz, Office Action, U.S. Appl. No. 13/302,755, Mar. 25, 2013, 15 pgs.
Google Inc., Office Action, CA 2603085, Sep. 18, 2012, 2 pgs.
Hogue, Notice of Allowance, U.S. Appl. No. 13/549,361, Oct. 2, 2013, 9 pgs.
Hogue, Notice of Allowance, U.S. Appl. No. 13/549,361, Jun. 26, 2013, 8 pgs.
Hogue, Notice of Allowance, U.S. Appl. No. 13/603,354, Jun. 26, 2013, 8 pgs.
Hogue, Office Action, U.S. Appl. No. 13/549,361, Mar. 6, 2013, 13 pgs.
Hogue, Office Action, U.S. Appl. No. 13/603,354, Jan. 9, 2013, 5 pgs.
Shamsi, Office Action, U.S. Appl. No. 13/171,296, Apr. 3, 2013, 7 pgs.
Zhao, Office Action, U.S. Appl. No. 11/941,382, Sep. 27, 2013, 30 pgs.
Betz, Notice of Allowance, U.S. Appl. No. 11/097,688, Nov. 19, 2013, 17 pgs.
Hogue, Notice of Allowance, U.S. Appl. No. 13/603,354, Nov. 12, 2013, 9 pgs.
Shamsi, Final Office Action, U.S. Appl. No. 13/171,296, Nov. 4, 2013, 29 pgs.

Example Format of Facts in Repository (each fact is associated with an object ID)

Example Facts in Repository (each fact is associated with an object ID)

Example Object
Reference Table

FIG. 2(d)
Example Format of Facts in
Repository (each fact is associated
with an object ID)

Example Objects

FINDING AND DISAMBIGUATING REFERENCES TO ENTITIES ON WEB PAGES

RELATED APPLICATIONS

This application is a continuation of U.S. patent application Ser. No. 11/551,657, entitled "Finding and Disambiguating References to Entities on Web Pages," filed Oct. 20, 2006 now U.S. Pat. No. 8,122,026, which application is incorporated by reference herein in its entirety.

TECHNICAL FIELD

The disclosed embodiments relate generally to information stored in the memory of a computer system. More particularly, the disclosed embodiments relate to disambiguating references to entities in documents stored in the memory of a computer system.

BACKGROUND

Ambiguity poses a serious challenge to the organization of information. For example, collecting information related to a particular entity is complicated by the existence of other entities with the same name. Overloading of entity names is common, whether the entity is a person ("Michael Jackson"), a place ("Paris"), or even a concept ("garbage collection").

It is frequently useful to know the specific entity to which a document is referring. For example, if the goal is to extract, organize, and summarize information about Michael Jackson (the singer), one will want to look only at documents about Michael Jackson (the singer), and not at documents other Michael Jacksons. The ambiguity of language, of names, and of other common properties makes determining which entity a document is referring to a difficult task. Therefore, what is needed is a method for disambiguating references to entities in a document.

SUMMARY

A system and method for disambiguating references to entities in a document stored in a memory of a data processing system. In one embodiment, an iterative process is used to disambiguate references to entities in documents. An initial model is used to identify documents referring to an entity based on features contained in those documents. The occurrence of various features in these documents is measured. From the number occurrences of features in these documents, a second model is constructed. The second model is used to identify documents referring to the entity based on features contained in the documents. The process can be repeated, iteratively identifying documents referring to the entity and improving subsequent models based on those identifications.

In one embodiment, additional features of the entity are extracted from documents identified as referring to the entity. These extracted features are tested to determine if it is likely that they are features frequently associated with the entity. If it is determined that the extracted features are features of the entity, they are used to identify documents referring to the entity and to construct subsequent models.

In one embodiment, the number of documents identified as referring to an entity is used to estimate the absolute and/or relative importance of the entity. The contribution to the importance of an entity given by a document can be weighted by the estimated likelihood that the document refers to the entity, a metric of the importance of the document itself, such as its PageRank, or both.

BRIEF DESCRIPTION OF THE DRAWINGS

FIGS. 2(a)-2(d) are block diagrams illustrating a data structure for facts within a repository of FIG. 1 in accordance with embodiments of the invention.

DESCRIPTION OF EMBODIMENTS

Embodiments of the present invention are now described with reference to the figures where like reference numbers indicate identical or functionally similar elements.

Figure 1:
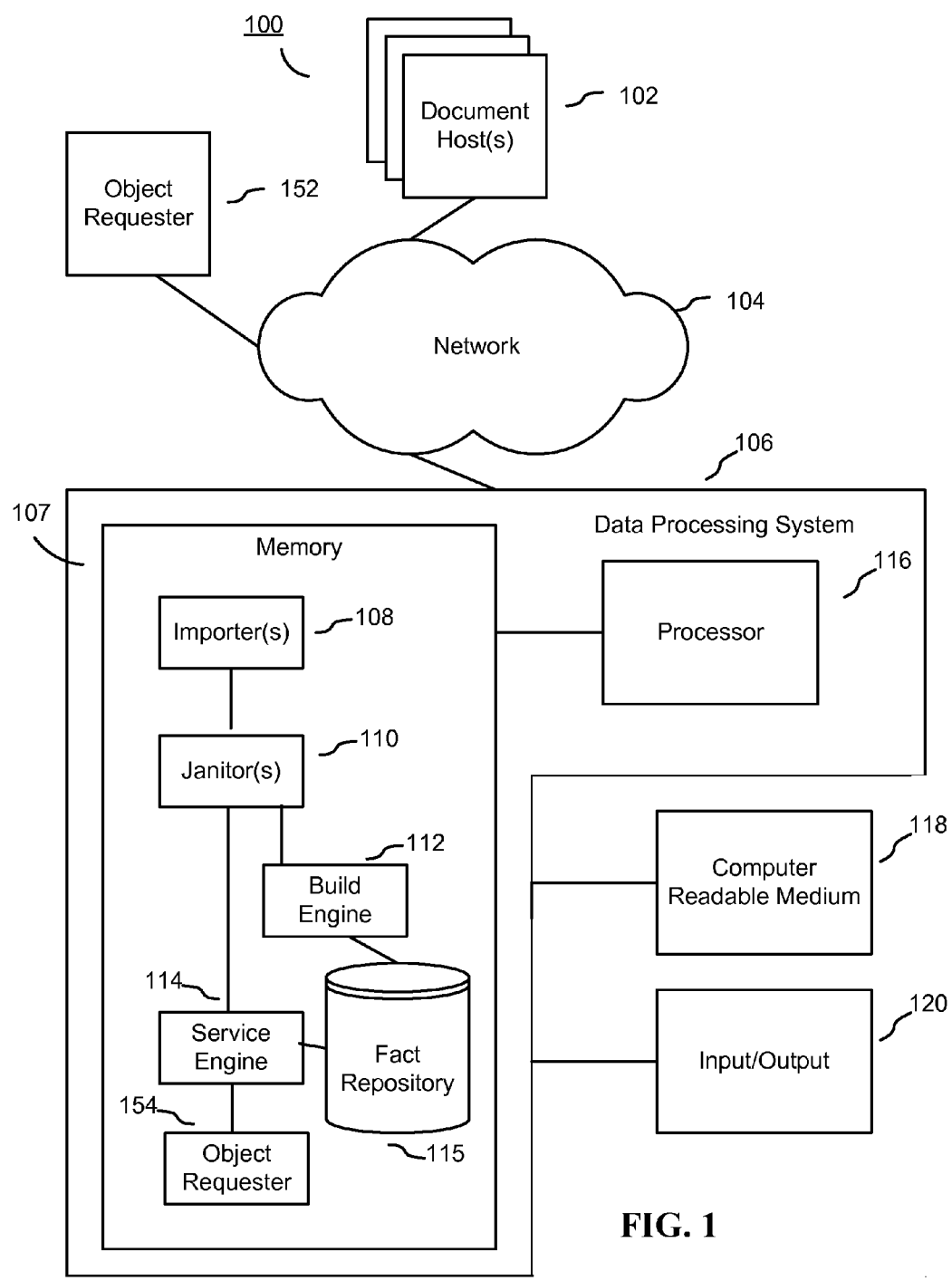
FIG. 1 shows a network, in accordance with an embodiment of the invention.

FIG. 1 shows a system architecture 100 adapted to support one embodiment of the invention. FIG. 1 shows components used to add facts into, and retrieve facts from a repository 115. The system architecture 100 includes a network 104, through which any number of document hosts 102 communicate with a data processing system 106, along with any number of object requesters 152, 154.

Document hosts 102 store documents and provide access to documents. A document is comprised of any machine-readable data including any combination of text, graphics, multimedia content, etc. A document may be encoded in a markup language, such as Hypertext Markup Language (HTML), i.e., a web page, in a interpreted language (e.g., JavaScript) or in any other computer readable or executable format. A document can include one or more hyperlinks to other documents. A typical document will include one or more facts within its content. A document stored in a document host 102 may be located and/or identified by a Uniform Resource Locator (URL), or Web address, or any other appropriate form of identification and/or location. A document host 102 is implemented by a computer system, and typically includes a server adapted to communicate over the network 104 via networking protocols (e.g., TCP/IP), as well as application and presentation protocols (e.g., HTTP, HTML, SOAP, D-HTML, Java). The documents stored by a host 102 are typically held in a file directory, a database, or other data repository. A host 102 can be implemented in any computing device (e.g., from a PDA or personal computer, a workstation, mini-computer, or mainframe, to a cluster or grid of computers), as well as in any processor architecture or operating system.

FIG. 1 shows components used to manage facts in a fact repository 115. Data processing system 106 includes one or more importers 108, one or more janitors 110, a build engine 112, a service engine 114, and a fact repository 115 (also called simply a "repository"). Each of the foregoing are implemented, in one embodiment, as software modules (or programs) executed by processor 116. Importers 108 operate to process documents received from the document hosts, read the data content of documents, and extract facts (as operationally and programmatically defined within the data processing system 106) from such documents. The importers 108 also determine the subject or subjects with which the facts are associated, and extract such facts into individual items of data, for storage in the fact repository 115. In one embodiment, there are different types of importers 108 for different types of documents, for example, dependent on the format or document type.

Janitors 110 operate to process facts extracted by importer 108. This processing can include but is not limited to, data cleansing, object merging, and fact induction. In one embodiment, there are a number of different janitors 110 that perform different types of data management operations on the facts. For example, one janitor 110 may traverse some set of facts in the repository 115 to find duplicate facts (that is, facts that convey the same factual information) and merge them. Another janitor 110 may also normalize facts into standard formats. Another janitor 110 may also remove unwanted facts from repository 115, such as facts related to pornographic content. Other types of janitors 110 may be implemented, depending on the types of data management functions desired, such as translation, compression, spelling or grammar correction, and the like.

Various janitors 110 act on facts to normalize attribute names, and values and delete duplicate and near-duplicate facts so an object does not have redundant information. For example, we might find on one page that Britney Spears' birthday is "12/2/1981" while on another page that her date of birth is "Dec. 2, 1981." Birthday and Date of Birth might both be rewritten as Birthdate by one janitor and then another janitor might notice that 12/2/1981 and Dec. 2, 1981 are different forms of the same date. It would choose the preferred form, remove the other fact and combine the source lists for the two facts. As a result when you look at the source pages for this fact, on some you'll find an exact match of the fact and on others text that is considered to be synonymous with the fact.

Build engine 112 builds and manages the repository 115. Service engine 114 is an interface for querying the repository 115. Service engine 114's main function is to process queries, score matching objects, and return them to the caller but it is also used by janitor 110.

Repository 115 stores factual information extracted from a plurality of documents that are located on document hosts 102. A document from which a particular fact may be extracted is a source document (or "source") of that particular fact. In other words, a source of a fact includes that fact (or a synonymous fact) within its contents.

Repository 115 contains one or more facts. In one embodiment, each fact is associated with exactly one object. One implementation for this association includes in each fact an object ID that uniquely identifies the object of the association. In this manner, any number of facts may be associated with an individual object, by including the object ID for that object in the facts. In one embodiment, objects themselves are not physically stored in the repository 115, but rather are defined by the set or group of facts with the same associated object ID, as described below. Further details about facts in repository 115 are described below, in relation to FIGS. 2(a)-2(d).

It should be appreciated that in practice at least some of the components of the data processing system 106 will be distributed over multiple computers, communicating over a network. For example, repository 115 may be deployed over multiple servers. As another example, the janitors 110 may be located on any number of different computers. For convenience of explanation, however, the components of the data processing system 106 are discussed as though they were implemented on a single computer.

In another embodiment, some or all of document hosts 102 are located on data processing system 106 instead of being coupled to data processing system 106 by a network. For example, importer 108 may import facts from a database that is a part of or associated with data processing system 106.

FIG. 1 also includes components to access repository 115 on behalf of one or more object requesters 152, 154. Object requesters are applications or components that request objects from repository 115. Object requesters 152, 154 may be understood as clients of the system 106, and can be implemented in any computer device or architecture. As shown in FIG. 1, a first object requester 152 is located remotely from system 106, while a second object requester 154 is located in data processing system 106. For example, in a computer system hosting a blog, the blog may include a reference to an object whose facts are in repository 115. An object requester 152, such as a browser displaying the blog will access data processing system 106 so that the information of the facts associated with the object can be displayed as part of the blog web page. As a second example, janitor 110 or other entity considered to be part of data processing system 106 can function as object requester 154, requesting the facts of objects from repository 115.

FIG. 1 shows that data processing system 106 includes a memory 107 and one or more processors 116. Memory 107 includes importers 108, janitors 110, build engine 112, service engine 114, and requester 154, each of which are preferably implemented as instructions stored in memory 107 and executable by processor 116. Memory 107 also includes repository 115. Repository 115 can be stored in a memory of one or more computer systems or in a type of memory such as a disk. FIG. 1 also includes a computer readable medium 118 containing, for example, at least one of importers 108, janitors 110, build engine 112, service engine 114, requester 154, and at least some portions of repository 115. FIG. 1 also includes one or more input/output devices 120 that allow data to be input and output to and from data processing system 106. It will be understood that data processing system 106 preferably also includes standard software components such as operating systems and the like and further preferably includes standard hardware components not shown in the figure for clarity of example.

Figure 2A:
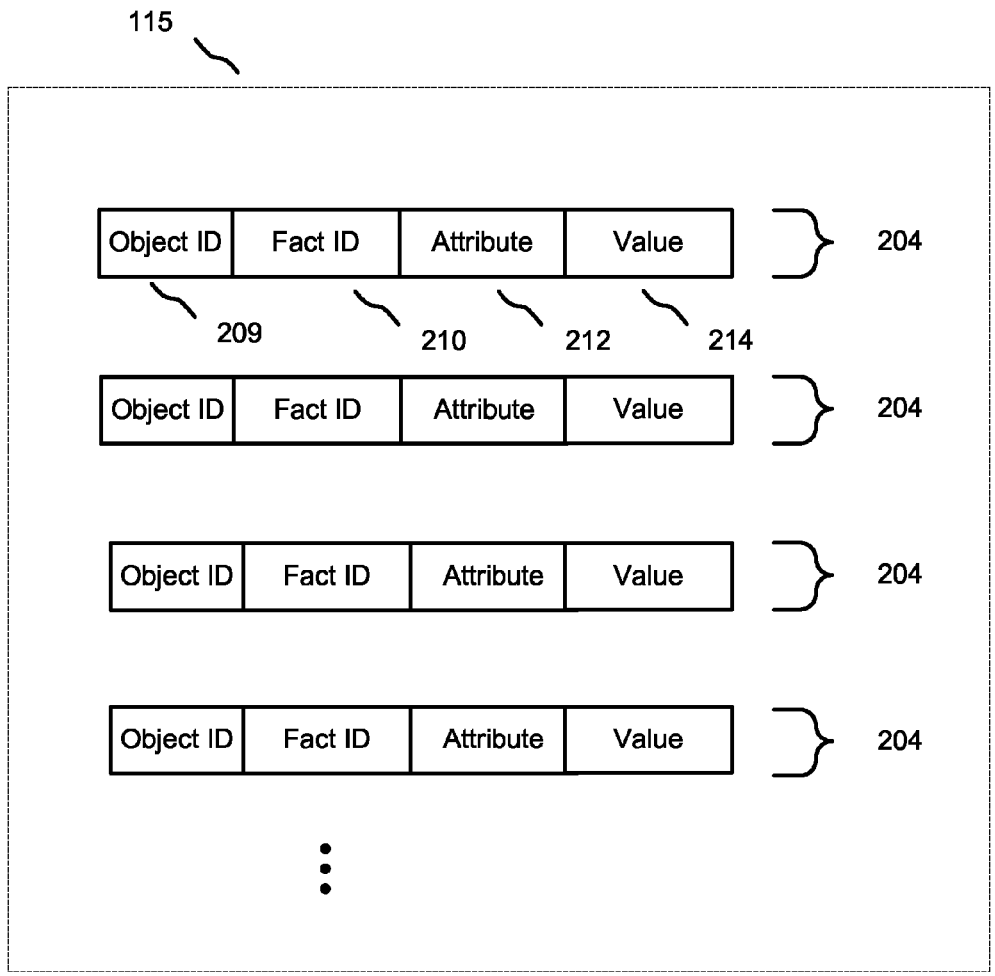

FIG. 2(a) shows an example format of a data structure for facts within repository 115, according to some embodiments of the invention. As described above, the repository 115 includes facts 204. Each fact 204 includes a unique identifier for that fact, such as a fact ID 210. Each fact 204 includes at least an attribute 212 and a value 214. For example, a fact associated with an object representing George Washington may include an attribute of "date of birth" and a value of "Feb. 22, 1732." In one embodiment, all facts are stored as alphanumeric characters since they are extracted from web pages. In another embodiment, facts also can store binary data values. Other embodiments, however, may store fact values as mixed types, or in encoded formats.

As described above, each fact is associated with an object ID 209 that identifies the object that the fact describes. Thus, each fact that is associated with a same entity (such as George Washington), will have the same object ID 209. In one embodiment, objects are not stored as separate data entities in memory. In this embodiment, the facts associated with an object contain the same object ID, but no physical object exists. In another embodiment, objects are stored as data entities in memory, and include references (for example, pointers or IDs) to the facts associated with the object. The logical data structure of a fact can take various forms; in general, a fact is represented by a tuple that includes a fact ID, an attribute, a value, and an object ID. The storage implementation of a fact can be in any underlying physical data structure.

Figure 2B:
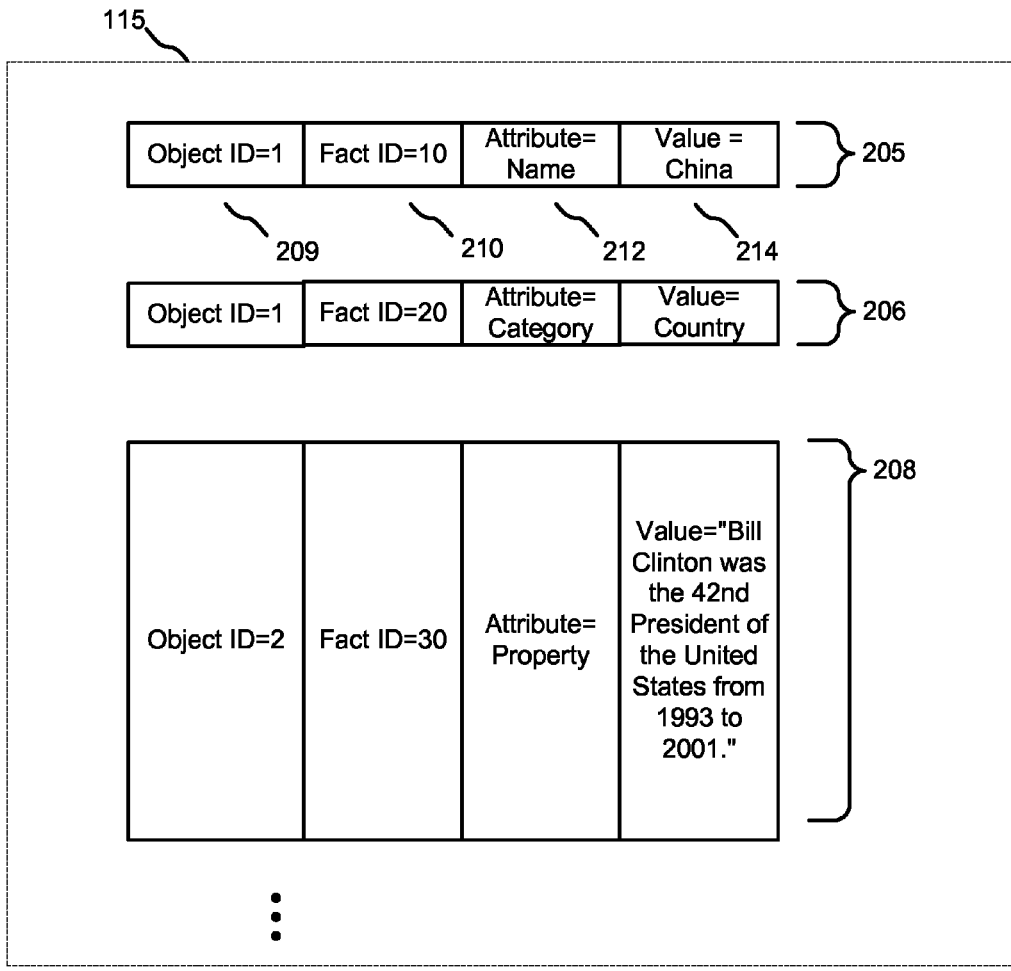

FIG. 2(b) shows an example of facts having respective fact IDs of 10, 20, and 30 in repository 115. Facts 10 and 20 are associated with an object identified by object ID "1." Fact 10 has an attribute of "Name" and a value of "China." Fact 20 has an attribute of "Category" and a value of "Country." Thus, the object identified by object ID "1" has a name fact 205 with a value of "China" and a category fact 206 with a value of "Country." Fact 30 208 has an attribute of "Property" and a value of "Bill Clinton was the 42nd President of the United States from 1993 to 2001." Thus, the object identified by object ID "2" has a property fact with a fact ID of 30 and a value of "Bill Clinton was the 42nd President of the United States from 1993 to 2001." In the illustrated embodiment, each fact has one attribute and one value. The number of facts associated with an object is not limited; thus while only two facts are shown for the "China" object, in practice there may be dozens, even hundreds of facts associated with a given object. Also, the value fields of a fact need not be limited in size or content. For example, a fact about the economy of "China" with an attribute of "Economy" would have a value including several paragraphs of text, numbers, perhaps even tables of figures. This content can be formatted, for example, in a markup language. For example, a fact having an attribute "original html" might have a value of the original html text taken from the source web page.

Also, while the illustration of FIG. 2(b) shows the explicit coding of object ID, fact ID, attribute, and value, in practice the content of the fact can be implicitly coded as well (e.g., the first field being the object ID, the second field being the fact ID, the third field being the attribute, and the fourth field being the value). Other fields include but are not limited to: the language used to state the fact (English, etc.), how important the fact is, the source of the fact, a confidence value for the fact, and so on.

Figure 2C:
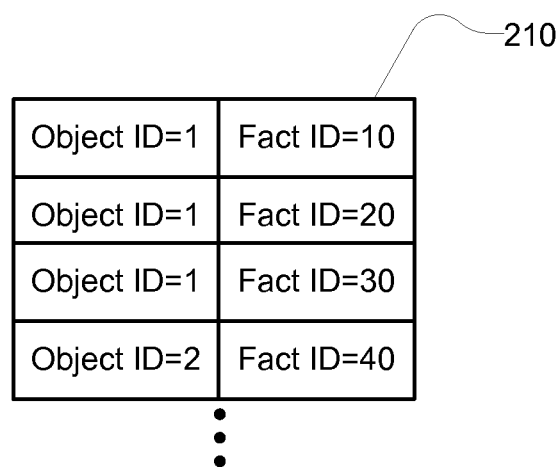

FIG. 2(c) shows an example object reference table 210 that is used in some embodiments. Not all embodiments include an object reference table. The object reference table 210 functions to efficiently maintain the associations between object IDs and fact IDs. In the absence of an object reference table 210, it is also possible to find all facts for a given object ID by querying the repository to find all facts with a particular object ID. While FIGS. 2(b) and 2(c) illustrate the object reference table 210 with explicit coding of object and fact IDs, the table also may contain just the ID values themselves in column or pair-wise arrangements.

Figure 2D:
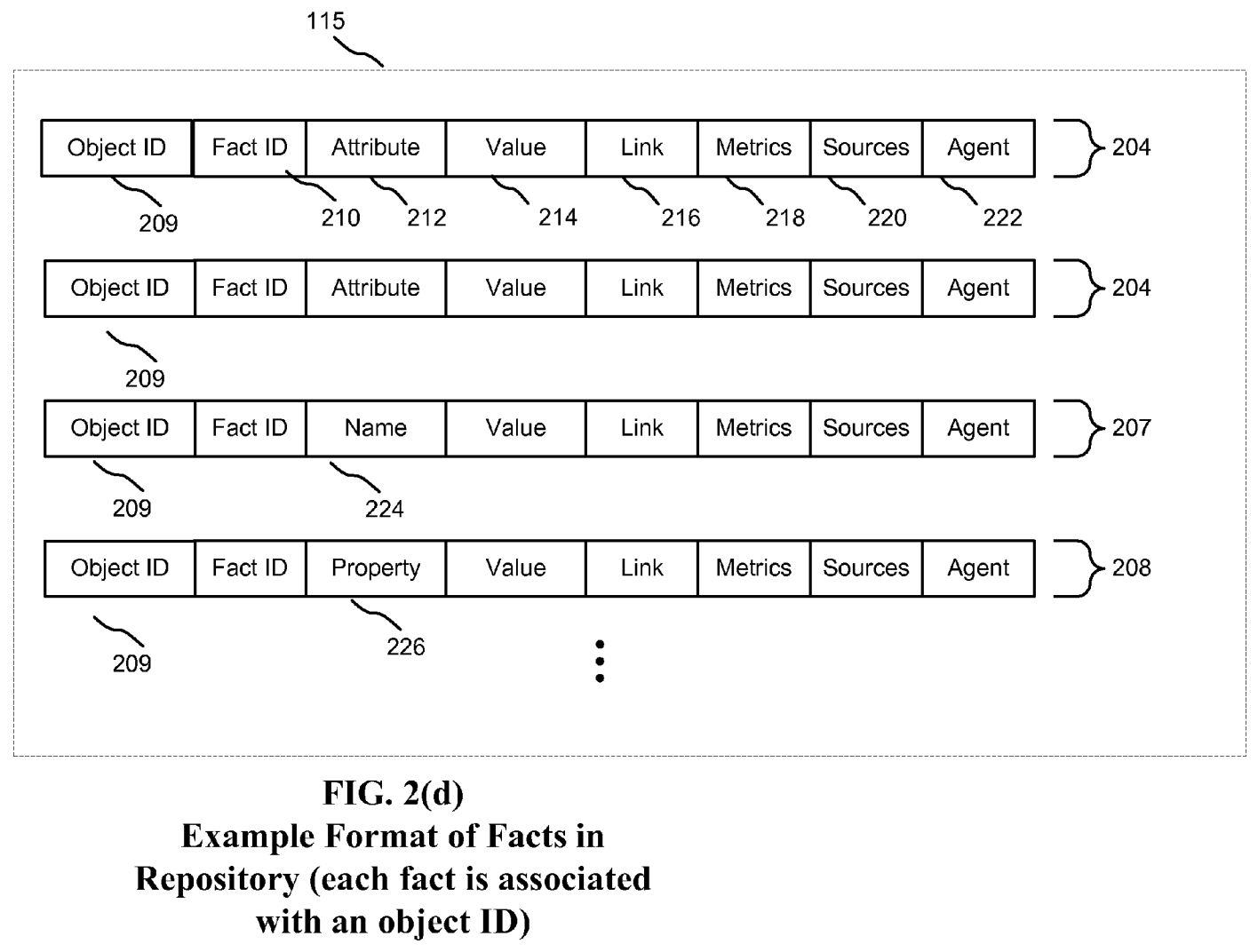

FIG. 2(d) shows an example of a data structure for facts within repository 115, according to some embodiments of the invention showing an extended format of facts. In this example, the fields include an object reference link 216 to another object. The object reference link 216 can be an object ID of another object in the repository 115, or a reference to the location (e.g., table row) for the object in the object reference table 210. The object reference link 216 allows facts to have as values other objects. For example, for an object "United States," there may be a fact with the attribute of "president" and the value of "George W. Bush," with "George W. Bush" being an object having its own facts in repository 115. In some embodiments, the value field 214 stores the name of the linked object and the link 216 stores the object identifier of the linked object. Thus, this "president" fact would include the value 214 of "George W. Bush", and object reference link 216 that contains the object ID for the for "George W. Bush" object. In some other embodiments, facts 204 do not include a link field 216 because the value 214 of a fact 204 may store a link to another object.

Each fact 204 also may include one or more metrics 218. A metric provides an indication of some quality of the fact. In some embodiments, the metrics include a confidence level and an importance level. The confidence level indicates the likelihood that the fact is correct. The importance level indicates the relevance of the fact to the object, compared to other facts for the same object. The importance level may optionally be viewed as a measure of how vital a fact is to an understanding of the entity or concept represented by the object.

Each fact 204 includes a list of one or more sources 220 that include the fact and from which the fact was extracted. Each source may be identified by a Uniform Resource Locator (URL), or Web address, or any other appropriate form of identification and/or location, such as a unique document identifier.

The facts illustrated in FIG. 2(d) include an agent field 222 that identifies the importer 108 that extracted the fact. For example, the importer 108 may be a specialized importer that extracts facts from a specific source (e.g., the pages of a particular web site, or family of web sites) or type of source (e.g., web pages that present factual information in tabular form), or an importer 108 that extracts facts from free text in documents throughout the Web, and so forth.

Some embodiments include one or more specialized facts, such as a name fact 207 and a property fact 208. A name fact 207 is a fact that conveys a name for the entity or concept represented by the object ID. A name fact 207 includes an attribute 224 of "name" and a value, which is the name of the object. For example, for an object representing the country Spain, a name fact would have the value "Spain." A name fact 207, being a special instance of a general fact 204, includes the same fields as any other fact 204; it has an attribute, a value, a fact ID, metrics, sources, etc. The attribute 224 of a name fact 207 indicates that the fact is a name fact, and the value is the actual name. The name may be a string of characters. An object ID may have one or more associated name facts, as many entities or concepts can have more than one name. For example, an object ID representing Spain may have associated name facts conveying the country's common name "Spain" and the official name "Kingdom of Spain." As another example, an object ID representing the U.S. Patent and Trademark Office may have associated name facts conveying the agency's acronyms "PTO" and "USPTO" as well as the official name "United States Patent and Trademark Office." If an object does have more than one associated name fact, one of the name facts may be designated as a primary name and other name facts may be designated as secondary names, either implicitly or explicitly.

A property fact 208 is a fact that conveys a statement about the entity or concept represented by the object ID. Property facts are generally used for summary information about an object. A property fact 208, being a special instance of a general fact 204, also includes the same parameters (such as attribute, value, fact ID, etc.) as other facts 204. The attribute field 226 of a property fact 208 indicates that the fact is a property fact (e.g., attribute is "property") and the value is a string of text that conveys the statement of interest. For example, for the object ID representing Bill Clinton, the value of a property fact may be the text string "Bill Clinton was the 42nd President of the United States from 1993 to 2001." Some object IDs may have one or more associated property facts while other objects may have no associated property facts. It should be appreciated that the data structures shown in FIGS. 2(a)-2(d) and described above are merely exemplary. The data structure of the repository 115 may take on other forms. Other fields may be included in facts and some of the fields described above may be omitted. Additionally, each object ID may have additional special facts aside from name facts and property facts, such as facts conveying a type or category (for example, person, place, movie, actor, organization, etc.) for categorizing the entity or concept represented by the object ID. In some embodiments, an object's name(s) and/or properties may be represented by special records that have a different format than the general facts records 204.

As described previously, a collection of facts is associated with an object ID of an object. An object may become a null or empty object when facts are disassociated from the object. A null object can arise in a number of different ways. One type of null object is an object that has had all of its facts (including name facts) removed, leaving no facts associated with its object ID. Another type of null object is an object that has all of its associated facts other than name facts removed, leaving only its name fact(s). Alternatively, the object may be a null object only if all of its associated name facts are removed. A null object represents an entity or concept for which the data processing system 106 has no factual information and, as far as the data processing system 106 is concerned, does not exist. In some embodiments, facts of a null object may be left in the repository 115, but have their object ID values cleared (or have their importance to a negative value). However, the facts of the null object are treated as if they were removed from the repository 115. In some other embodiments, facts of null objects are physically removed from repository 115.

Figure 2E:
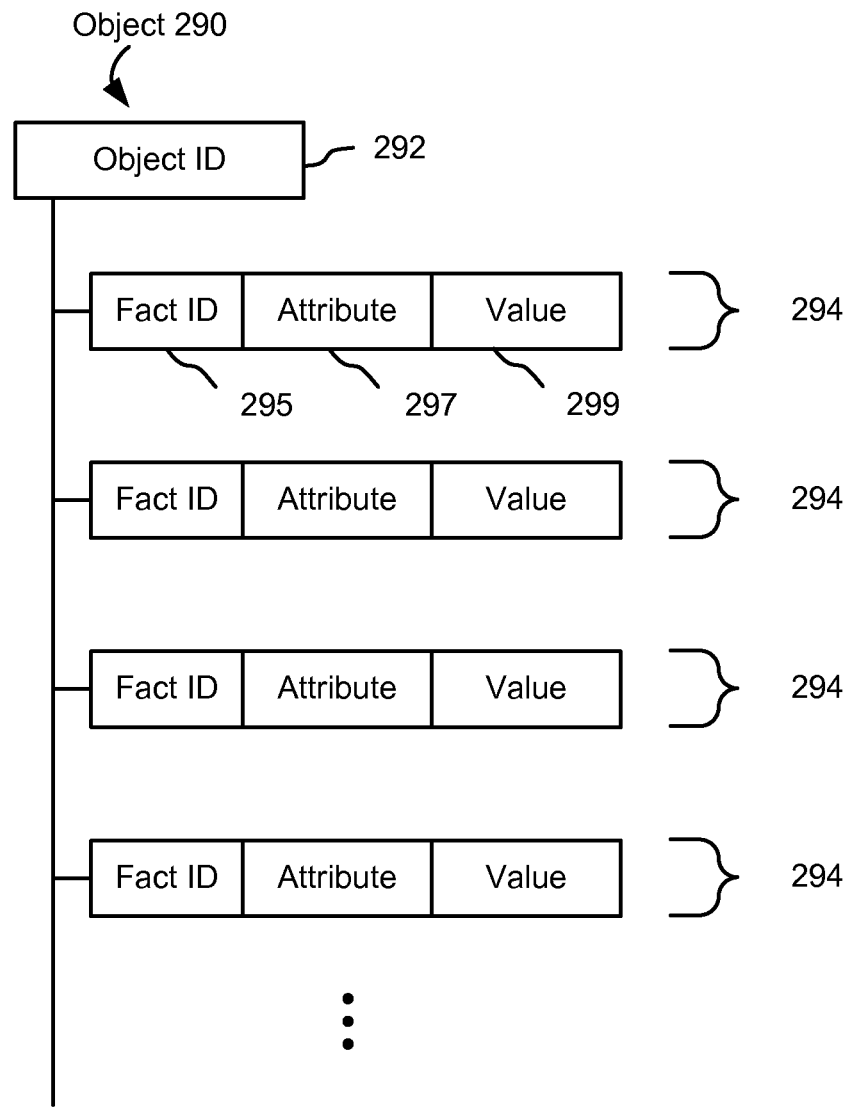
FIG. 2(e) is a block diagram illustrating an alternate data structure for facts and objects in accordance with embodiments of the invention.

FIG. 2(e) is a block diagram illustrating an alternate data structure 290 for facts and objects in accordance with embodiments of the invention. In this data structure, an object 290 contains an object ID 292 and references or points to facts 294. Each fact includes a fact ID 295, an attribute 297, and a value 299. In this embodiment, an object 290 actually exists in memory 107.

Figure 3:
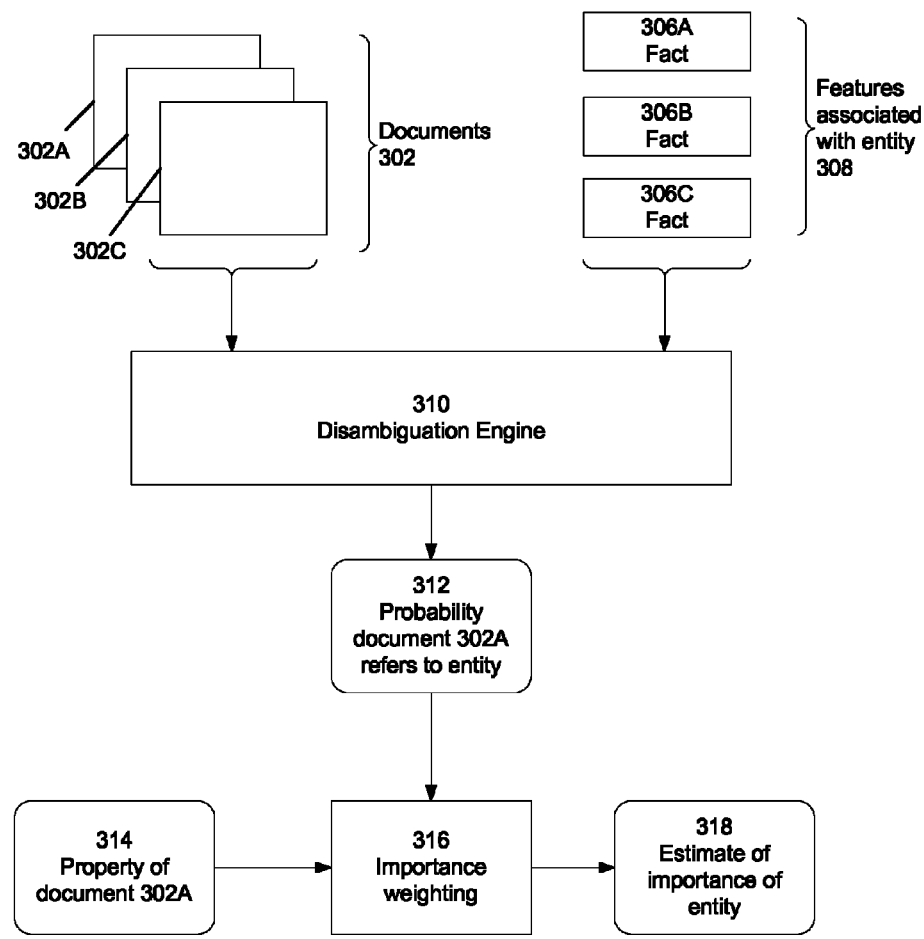
FIG. 3 illustrates a system for estimating the importance of an entity, according to one embodiment of the present invention.

FIG. 3 illustrates a system for estimating the importance of an entity, according to one embodiment of the present invention. In one embodiment, the system is implemented in a janitor. The system estimates the importance of the entity based on the references to the entity in documents 302. Some of the documents 302 contain one or more references to the entity; other documents 302 do not contain any references to the entity. Some of the documents 302 contain ambiguous references. An ambiguous reference is a reference that may or may not refer to the entity. In the case of certain ambiguous references, whether or not the reference refers to the entity can be difficult to determine based on the document 302 alone. Further processing of the document 302 containing the ambiguous reference, along with other documents 302, can be used to estimate a probability that the ambiguous reference refers to the entity.

A document 302 can be, for example, a web page, a Word document, an Excel spreadsheet, a personal online document (such as a Google Spreadsheet), a record in a database, or an image, audio, or video file. These examples have been given for the purposes of illustration and are not limiting. Other examples of documents 302 will be apparent to one of skill in the art without departing from the scope of the present invention. Furthermore, the documents 302 need not be of the same type. For example, according to one embodiment of the present invention, one document 302 can be an a web page and another document 302 can be a video file. In one embodiment, one or more of the documents 302 are or have been retrieved over the internet.

Features 308 are associated with the entity to which it is desired to disambiguate references. A feature is any property that can be represented in or by a document 302. For example, if the entity is Bob Dylan, features of the entity Bob Dylan could include, for example, the text "Bob Dylan", an image of Bob Dylan, an audio clip of a song by Bob Dylan, a sentence about Bob Dylan, and so on. Features can also include metadata, geographic information, URLs, and other types of data that can be associated with an entity and/or a document.

In one embodiment, various features of the entity are stored as facts 306 in a fact repository. In this example, the facts 306 have a common object ID indicating that the facts 306 contain features associated with a common entity.

A disambiguation engine 310 is configured to receive the documents 302 and the facts 306 and return a probability 312 that a particular document refers to the entity. A method for estimating a probability 312 that a particular document refers to the entity is described herein with reference to FIG. 4.

In one embodiment, the probability 312 is used to estimate the relative or absolute importance of the entity. The probability 312 is an input to importance weighting 316, which returns an estimate 318 of the importance of the entity. In one embodiment, the importance of an entity is calculated as the net number of references (or likely references) to that entity on the world wide web. In another embodiment, the importance of an entity is calculated based on the probability 312 that one or more of the documents 302 refer to the entity. In another embodiment, the importance of an entity is based on a property 314 of a document that refers to the entity. For example, the importance of an entity can be calculated based on the PageRank of any web pages determined to be likely to refer to the entity. In yet another embodiment, the importance of an entity is based on the probability 312 that a document 302A refers to the entity and the PageRank property 314 of the document 302A. A sum of contributions by the various documents 302 can be taken to determine the estimate 318 of the importance of the entity. For example, the importance (I) of an entity (E) could be based on:

$$I_E = \sum_{A}^{all\_documents} P_E(A) * R(A)$$

where A is a document, $P_E(A)$ is the probability that document A refers to the entity E, R(A) is the PageRank (or other property) of document A, and all_documents is a set of available documents (such as available documents with a probability of referring to entity E above some threshold).

In one embodiment, the probability 312 that a document 302A refers to the entity can be used to assist with the creation of new facts 306. For example, the document 302A may contain a feature not currently stored as a fact 306. If it is likely that the document 302A refers to the entity, additional facts 306 can be extracted and stored with an object ID indicating that they are associated with the entity. In one embodiment, the additional facts 306 are extracted responsive to the probability 312. In another embodiment, information regarding the entity to which the document 302A likely refers is stored for use by an importer 108 for future extractions.

In one embodiment, if the probability 312 is above some threshold, the document 302A is associated with the entity. For example, a link to the document 302A can be stored as a fact with an object ID indicating that the fact is associated with the entity. Advantageously, a fact is available in the fact repository citing a document 302A that refers to the entity.

Figure 4:
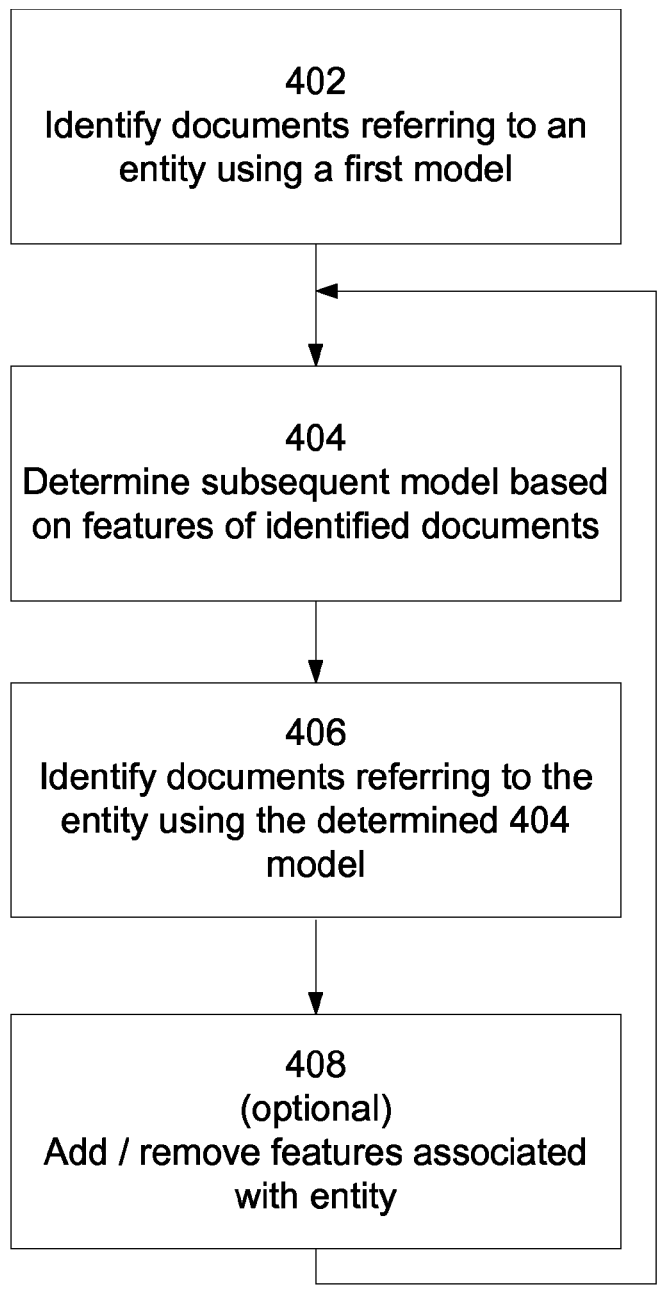
FIG. 4 illustrates a method for disambiguating references to an entity, according to one embodiment of the present invention.

FIG. 4 illustrates a method for disambiguating references to an entity, according to one embodiment of the present invention. In one embodiment, the method is performed by the disambiguation engine 310. According to various embodiments, the method can be performed by any kind of computer system. For example, in one embodiment, the method described herein can be used to disambiguate references in mail messages using facts obtained from a directory server. As another example, the method can be used to disambiguate references in documents on a user's machine.

The disambiguation engine 310 identifies 402 documents referring to an entity using a first model. A model is a set of rules specifying at least one combination of features sufficient for identifying a document referring to a particular entity. For example, a model can specify the probability that a document refers to a particular entity given a set of features in the document. The first model is used to identify a first set of documents likely to refer to the entity.

The disambiguation engine 310 determines 404 a subsequent model based on the features of the documents that are identified 402 as referring to the entity. For example, analysis of the documents identified 402 as referring to the entity can provide insights into the characteristics of documents that refer to the entity. These insights can be codified into a subsequent model. Further discussion of methods for determining 404 a subsequent model is included below.

The disambiguation engine 310 identifies 406 documents referring to the entity using the determined 404 model. The determined 404 model is used to identify 406 a second set of documents likely to refer to the entity. In one embodiment, the disambiguation engine 310 returns to determining 404 a subsequent model based on the identified 406 documents. The disambiguation engine 310 iterates through the loop illustrated in the method, advantageously converging towards increasingly accurate models. After some number of iterations, the disambiguation engine 310 returns the probabilities that various documents refer to the entity. In one embodiment, the disambiguation engine 310 returns a list of documents with a probability of referring to the entity above some threshold. In another embodiment, the disambiguation engine 310 returns a list of entities to which is it likely a particular document refers. For example, the disambiguation engine 310 can return a list of entities organized by the likelihood that the document refers to those entities. An entity to which it is more likely that the document refers could be listed above an entity to which it is less likely that the document refers. Entities below some likelihood threshold could be omitted from the list.

Furthermore, the list can also include an unknown entity. If a document refers to an entity of which few or no features are known, an unknown entity may be the most likely entity to which the document refers. For example, suppose the disambiguation engine 310 is aware of two "Michael Jackson" entities, the singer and the Secretary of Homeland Security. Many documents will be about one of these two entities, but numerous other pages will be about Michael Jacksons unknown to the disambiguation engine 310. The entity to which these documents most likely refer may be an "unknown" entity.

The number of iterations through the loop illustrated in FIG. 4 can depend on a variety of factors. For example, the disambiguation engine 310 can iterate a predetermined number of times. As other examples, the disambiguation engine 310 can iterate until the model has converged on a stable condition, a predetermined resource budget has been consumed, the improvement provided by an iteration falls below some improvement threshold, an iteration does not introduces a number of new features that falls below some threshold, the Kullback-Leibler divergence between the probability distribution over entity assignments to documents in subsequent iterations falls below some threshold, and so on. Other examples of methods for determining the number of times the disambiguation engine 310 should iterate will be apparent to one of ordinary skill in the art without departing from the scope of the present invention.

In one embodiment, the disambiguation engine 310 further adds/removes 408 features associated with the entity. For example, based on the documents identified 406 as referring to the entity, features associated with the entity can be removed, or new features can be associated with the entity. In one embodiment, added 408 features are used provisionally in a determine 404/identify 406 iteration. If the added 408 features behave in the model as other features of the entity, the features can be included as regular features. In one embodiment, added 408 features can be stored as facts in a fact repository.

In one embodiment, the first model indicates that a document contains a reference to the entity if the name of the entity and one other feature occurs in the document. The first model can also include further requirements, such as a requirement that the name of the entity and the other feature occur within some spatial range of each other, or that additional non-name features occur in the document. The disambiguation engine 310 identifies 402 a first set of documents that, based on the first model, are likely to refer to the entity. A feature can be a fact stored in a fact repository, or any word, n-gram, or syntactic or semantic feature of the text.

In one embodiment, determining 404 a subsequent model includes analyzing the available documents and the first set of documents. The disambiguation engine 310 counts the number of occurrences of features in the available documents, the number of occurrences of features in the first set of documents, the total number of available documents, and the number of documents in the first set. The number of documents in the first set and the number of available documents can be used to estimate the probability that a document refers to the entity. The number of occurrences of a particular feature in the available documents and the total number of available documents can be used to estimate the probability of the feature occurring in a document. The number of occurrences of a particular feature in the first set of documents and the number of documents in the first set can be used to estimate the probability of the feature occurring in a document that refers to the entity. The probability that a document refers to the entity, the probability of a feature occurring in a document, and the probability of the feature occurring in a document that refers to the entity can be used to estimate the probability that a document refers to the entity given that a particular feature occurs. In one embodiment, a subsequent model is based on a set of estimated probabilities that a document refers to the entity given that a particular feature occurs.

In one embodiment, identifying 406 documents referring to the entity using the determined 404 model includes determining the probability that a document refers to the entity. The probability that a document refers to the entity can be based on a combination of the probabilities that a document refers to the entity given that a particular feature occurs (as indicated by the model) for all features that occur in the document. In one embodiment, documents with a higher likelihood of referring the entity compared to other available documents are identified 406 as referring to the entity.

In various embodiments, various probabilistic techniques can be implemented to estimate the probability that a document refers to an entity using an iterative series of models. For example, in one embodiment, a Bayes Net Noisy-Or model is used to model the documents and to estimate the probability that documents refer to various entities. Other example of models and probabilistic techniques (including decision trees, maximum entropy models, and so on) will be apparent to one of skill in the art without departing from the scope of the present invention.

Figure 5:
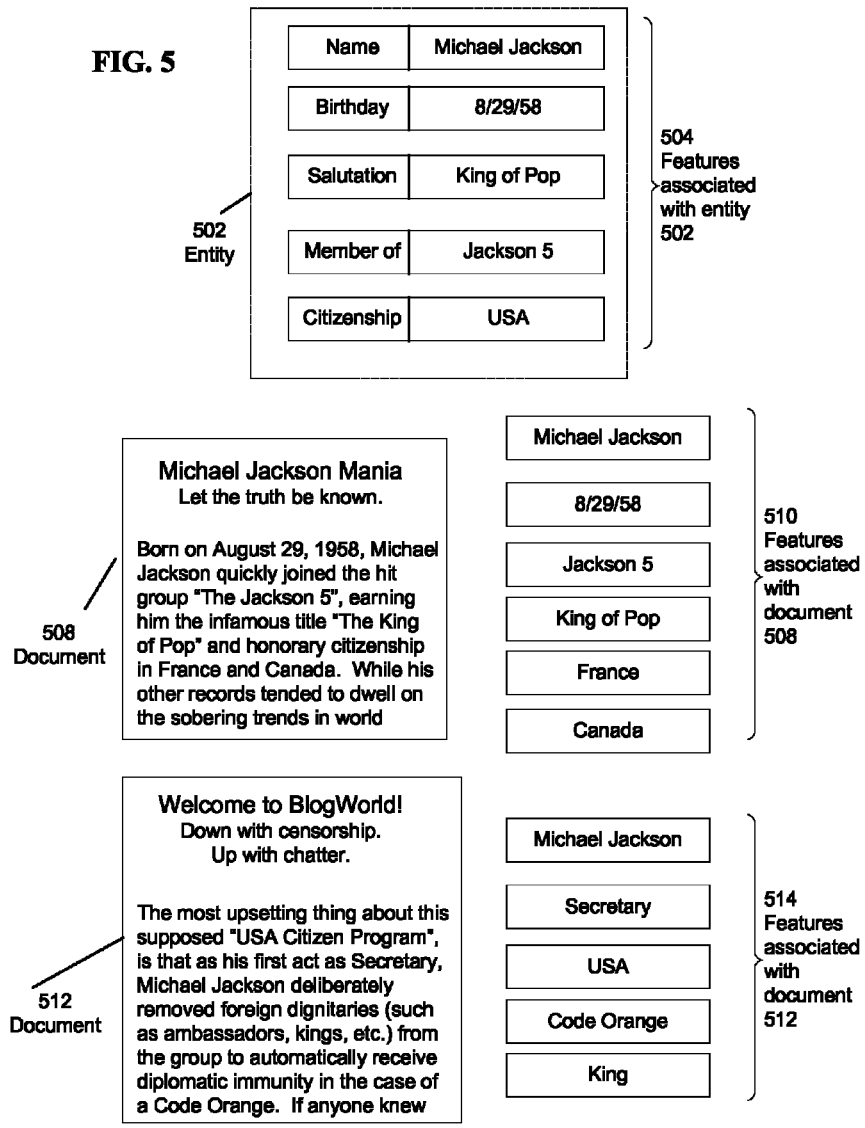
FIG. 5 illustrates several examples of features associated with an entity and features associated with various documents, according to one embodiment of the present invention.

FIG. 5 illustrates several examples of features associated with an entity and features associated with various documents, according to one embodiment of the present invention. In the example illustrated, the entity 502 is Michael Jackson, the former member of the Jackson 5, commonly known as the "King of Pop". The entity 502 is associated with several features 504, including, for example, the name "Michael Jackson", the birthday "Aug. 29, 1958", the sobriquet "King of Pop", membership in "Jackson 5" and citizenship of "USA". In one embodiment, the features 502 associated with entity 502 are stored as facts in a fact repository.

The Michael Jackson described above is given as an example of an entity 502 for which it is desired to disambiguate references. For example, documents can be collected from the world wide web and analyzed to determine if they refer the entity 502. Examples of such documents are shown as document 508 and document 512, which can be obtained from a variety of potential sources.

Document 508 contains some text describing a "Michael Jackson". Based on the contents of the document 508, some features 510 are associated with the document 508. In the example illustrated, the features 510 include "Michael Jackson", "Aug. 29, 1958", "Jackson 5", "King of Pop", "France" and "Canada".

Document 512 also contains some text describing a "Michael Jackson". Based on the contents of the document 512, some features 514 are associated with the document 512. In the example illustrated, the features 514 include "Michael Jackson", "Secretary", "USA", "Code Orange" and "King". It is desired to estimate the probability that document 508 refers to the entity 502, and to estimate the probability that document 512 refers to the entity 502.

In one embodiment, the disambiguation engine 310 identifies 402 documents referring to the entity 502 using a first model. For example, the disambiguation engine 310 identifies documents containing the name of the entity 502 and one other non-name feature. In the example illustrated, using the first model the document 508 is identified 402 as referring to the entity 502, because the document 508 matches some of the features 504, specifically "Michael Jackson", "Aug. 29, 1958", and "King of Pop". In the example illustrated, using the first model the document 512 is also identified 402 as referring to the entity 502, because the document 512 contains the features "Michael Jackson" and "USA". In one embodiment, additional documents (not shown) are also analyzed. The other documents may or may not contain sufficient features to be identified as referring to the entity 502 using the first model.

Based on the features of the document 508, the document 512, and other documents identified 402 as referring to the entity 502 using the first model, the disambiguation engine 310 determines 404 a subsequent model. For example, analysis of the identified 402 documents may indicate that the feature "Aug. 29, 1958" occurs frequently in the identified 402 documents and less frequently in other available documents. Therefore, in the subsequent model, the feature "Aug. 29, 1958" would be considered more indicative of a reference to the entity 502 than other features. As another example, analysis of the identified 402 documents may indicate that the feature "USA" occurs sometimes in the identified 402 documents, but with similar frequency in the available documents as a whole. Therefore, in the subsequent model, the feature "USA" would not be considered more indicative of a reference to the entity 502 than other features, and in fact might be considered less indicative of a reference to the entity 502 than other features.

The disambiguation engine 310 identifies 406 documents referring to the entity 502 using the determined 404 model. In the new model, the feature "Aug. 29, 1958" is given more weight than the feature "USA". Using the new model, document 508 is identified 406 as referring to the entity 502, because the document 508 contains several features considered highly indicative of references to the entity 502. On the other hand, using the new model, document 512 is not identified 406 as referring to the entity 502, because the document 508 contains only a few features, and those features are not considered highly indicative of references to the entity 502. Advantageously, documents not referring to the entity 502 are not included in the set of documents referring to the entity, despite being included in the set of documents identified using the first model.

Furthermore, additional documents (not shown) that were not identified 402 as referring to the entity 502 using the first model can be identified 406 as referring to the entity 406 using the subsequent model. Such documents may contain features not considered indicative of reference to the entity under the first (or previous) model, but that are considered indicative of reference to the entity under the subsequent model. Advantageously, documents referring to the entity 502 are included in the set of documents referring to the entity, despite not being included in the set of documents identified using the first model.

In one embodiment, a feature of the entity and a feature in a document need not match exactly for the feature of the entity to be considered to be present in the document. Various techniques such as string clustering, proximity estimation, and so on can be used to determine if a feature is contained in a document. For example, a document containing the text "Michel Jackson" might be determined to contain the feature "Michael Jackson", despite differences in the literal text. Features can be matched based on acoustic similarity, keyword proximity, synonymy, membership in the same category in a semantic network and so on. In one embodiment, features can be matched based on edit distance models that account for typographical errors attributed to keyboard layout. For example, the feature "magazine" might be matched by the text "magazune" because of the proximity in keyboard layout of the letter 'i' and the letter 'u'. Canonicalization and other information organizing techniques can also be applied to features in the document to facilitate comparison to the features of the entity. For example, in the example illustrated in FIG. 5, document 508 includes the text "Aug. 29, 1958". This date can be canonicalized as "8/29/1958" for efficient comparison to features of the entity.

In one embodiment, the domain from which a document is obtained can be considered a feature of the document, or can imply other features in the document. For example, a document retrieved from "espn.com" could implicitly match the features "sports" and "espn" even if neither of the words is actually present. Similarly, a page on the UCLA domain could implicitly match the features "ucla" and "university of california". Basing matches on the source from which a document was obtained advantageously improves disambiguation of references.

In one embodiment, a feature of an entity can be recognized in a document based on category. For example, the entity "Bud Selig" may be associated with the feature "baseball team". The feature "baseball team" can be identified as a category including one or more members. A document containing the feature "white sox" (an example of a member of the "baseball team" category) would be recognized as containing the feature "baseball team", even though the term "baseball team" might not literally appear in the document. Features identified by category can be weighted, for example, by the estimated likelihood that the feature is a true member of the category.

Reference in the specification to "one embodiment" or to "an embodiment" means that a particular feature, structure, or characteristic described in connection with the embodiments is included in at least one embodiment of the invention. The appearances of the phrase "in one embodiment" in various places in the specification are not necessarily all referring to the same embodiment.

Some portions of the above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the present invention as described herein, and any references below to specific languages are provided for disclosure of enablement and best mode of the present invention.

While the invention has been particularly shown and described with reference to an embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A method for identifying documents referring to an entity, the entity being associated with a first set of features, the method comprising:

at a computer having one or more processors and memory storing programs for execution by the one or more processors:

identifying a first set of documents based on a first model and the first set of features, wherein the first model includes a first set of rules specifying at least one combination of features from the first set of features that are sufficient for identifying a document referring to the entity, and each document in the first set of documents includes a sufficient number of features in common with the first set of features to identify a document referring to the entity according to the first model;

determining a second model based on features included in one or more documents in the first set of documents, wherein the second model includes a second set of rules specifying at least one combination of features from the first set of documents that are sufficient for identifying a document referring to the entity;

identifying a second set of documents based on the second model, wherein each document in the second set of documents includes a sufficient number of features in common with the first set of features to identify a document referring to the entity according to the second model, and wherein the second set of documents includes at least one document not included in the first set of documents; and extracting one or more facts from the second set of documents and associating the extracted facts with the entity.

2. The method of claim 1, wherein the first set of features is stored as a set of facts in a fact repository in association with a second object that corresponds to the entity.

3. The method of claim 1, wherein the first model is different than the second model.

4. The method of claim 1, wherein determining the second model comprises determining a number of occurrences of the first set of features in the first set of documents.

5. The method of claim 1, further comprising:
identifying a second set of features based on the second set of documents;
determining if the second set of features are associated with the entity; and
responsive to determining that the second set of features are associated with the entity, identifying a third set of documents based on a third model and the second set of features, each document of the third set of documents comprising a sufficient number of features in common with the second set of features to identify a document referring to the entity according to the third model.

6. The method of claim 5, wherein the second set of features includes at least one feature not included in the first set of features.

7. The method of claim 5, wherein the first set of features includes at least one feature not included in the second set of features.

8. The method of claim 5, further comprising: storing at least one feature of the second set of features as a fact in the fact repository.

9. The method of claim 1, further comprising:
estimating importance of the entity based on the second set of documents.

10. The method of claim 1, further comprising:
estimating importance of the entity based on a number of documents in the second set of documents.

11. The method of claim 1, further comprising:
estimating importance of the entity based on an estimated importance of at least one of the documents in the second set of documents.

12. The method of claim 1, further comprising:
associating at least one of the documents of the second set of documents with the entity.

13. The method of claim 1, wherein identifying a second set of documents based on the second model and the first set of features comprises estimating a probability that a document of the second set of documents refers to the entity.

14. The method of claim 1, wherein the first set of features comprises at least a first feature and a second feature, and wherein the second model specifies that an occurrence of the first feature is sufficient to identify a document referring to the entity.

15. The method of claim 14, wherein the second model specifies that an occurrence of the second feature is not sufficient to identify a document referring to the entity.

16. A non-transitory computer readable storage medium storing one or more programs configured for execution by a computer, the one or more programs comprising instructions for:
identifying a first set of documents based on a first model and a first set of features, wherein the first model includes a first set of rules specifying at least one combination of features from the first set of features that are sufficient for identifying a document referring to an entity, and each document in the first set of documents includes a sufficient number of features in common with the first set of features to identify a document referring to an entity according to the first model;
determining a second model based on features included in one or more documents in the first set of documents, wherein the second model includes a second set of rules specifying at least one combination of features from the first set of documents that are sufficient for identifying a document referring to the entity;
identifying a second set of documents based on the second model, wherein each document in the second set of documents includes a sufficient number of features in common with the first set of features to identify a document referring to the entity according to the second model, and wherein the second set of documents includes at least one document not included in the first set of documents; and
extracting one or more facts from the second set of documents and associating the extracted facts with the entity.

17. The non-transitory computer readable storage medium of claim 16, wherein the first set of features is stored as a set of facts in the fact repository in association with a second object that corresponds to the entity.

18. The non-transitory computer readable storage medium of claim 16, wherein the first model is different than the second model.

19. A computer system comprising:
a processor;
memory; and
one or more programs, wherein the one or more programs comprising instructions for:
identifying a first set of documents based on a first model and an first set of features, wherein the first model includes a first set of rules specifying at least one combination of features from the first set of features that are sufficient for identifying a document referring to an entity, and each document in the first set of documents includes a sufficient number of features in common with the first set of features to identify a document referring to the entity according to the first model;
determining a second model based on features included in one or more documents in the first set of documents, wherein the second model includes a second set of rules specifying at least one combination of features from the first set of documents that are sufficient for identifying a document referring to the entity;
identifying a second set of documents based on the second model, wherein each document in the second set of documents includes a sufficient number of features in common with the first set of features to identify a document referring to the entity according to the second model, and wherein the second set of documents includes at least one document not included in the first set of documents; and
extracting one or more facts from the second set of documents and associating the extracted facts with the entity.

20. The system of claim 19, wherein the first set of features is stored as a set of facts in the fact repository in association with a second object that corresponds to the entity.

* * * * *